(12) United States Patent
Fehr et al.

(10) Patent No.: US 11,608,936 B2
(45) Date of Patent: *Mar. 21, 2023

(54) DISPLAY MOUNTING BRACKET

(71) Applicant: CKnapp Sales, Inc., Goodfield, IL (US)

(72) Inventors: Micah Fehr, Danvers, IL (US); Brandon Meyer, Normal, IL (US)

(73) Assignee: CKnapp Sales, Inc., Goodfield, IL (US)

( * ) Notice: Subject to any disclaimer, the term of this patent is extended or adjusted under 35 U.S.C. 154(b) by 81 days.

This patent is subject to a terminal disclaimer.

(21) Appl. No.: 17/345,027

(22) Filed: Jun. 11, 2021

(65) Prior Publication Data
US 2021/0310610 A1    Oct. 7, 2021

Related U.S. Application Data

(63) Continuation-in-part of application No. 16/537,789, filed on Aug. 12, 2019, now Pat. No. 11,060,660.

(51) Int. Cl.
| | |
|---|---|
| *F16M 11/00* | (2006.01) |
| *F16M 13/02* | (2006.01) |
| *F16B 2/12* | (2006.01) |
| *F16M 11/04* | (2006.01) |
| *A47B 97/00* | (2006.01) |

(52) U.S. Cl.
CPC .............. *F16M 13/022* (2013.01); *F16B 2/12* (2013.01); *F16M 11/041* (2013.01); *A47B 97/001* (2013.01)

(58) Field of Classification Search
CPC .... F16M 13/022; F16M 11/041; F16M 11/04; F16M 13/02; F16B 2/12; F16B 2/065; A47B 97/001

See application file for complete search history.

(56) References Cited

U.S. PATENT DOCUMENTS

| | | | |
|---|---|---|---|
| 3,188,028 | A | 6/1965 | Waller |
| D480,237 | S | 10/2003 | de Carolis |
| 8,276,864 | B2 | 10/2012 | Ye et al. |
| 9,523,461 | B2 | 12/2016 | Kuan |
| 9,775,264 | B1 | 9/2017 | Chiu et al. |
| 2013/0153726 | A1 | 6/2013 | Truckor |
| 2015/0250315 | A1 | 9/2015 | Gross et al. |

(Continued)

OTHER PUBLICATIONS

Notice of Allowance for U.S. Appl. No. 16/537,789 dated May 10, 2021.

*Primary Examiner* — Amy J. Sterling
(74) *Attorney, Agent, or Firm* — Marshall, Gerstein & Borun LLP

(57) ABSTRACT

A display mounting bracket includes a horizontal mounting arm and a mounting plate, a vertical bottom mounting arm, and a vertical top mounting arm attached to the horizontal mounting arm. The vertical bottom mounting arm is movable and positionable at multiple positions along a longitudinal axis of the horizontal mounting arm. A first display bracket is attached to a first end of the vertical bottom mounting arm and a second display bracket is attached to a first end of the vertical top mounting arm. A first compression pad is movably secured to the vertical bottom mounting arm and a second compression pad movably secured to the vertical top mounting arm.

13 Claims, 19 Drawing Sheets

(56) References Cited

U.S. PATENT DOCUMENTS

| | | | | |
|---|---|---|---|---|
| 2018/0252357 A1* | 9/2018 | Kahn | .................. | A47B 97/001 |
| 2021/0332936 A1* | 10/2021 | Lyu | ....................... | F16M 11/18 |
| 2022/0022647 A1* | 1/2022 | Carral O Gorman | . | F16M 13/02 |
| 2022/0038129 A1* | 2/2022 | Alexander | ............ | F16M 11/04 |

* cited by examiner

DISPLAY MOUNTING BRACKET

CROSS-REFERENCE TO RELATED APPLICATIONS

This application is a continuation-in-part of U.S. patent application Ser. No. 16/537,789, entitled "Display Mounting Bracket" and filed on Aug. 12, 2019, the entire disclosure of which is hereby incorporated by reference herein.

FIELD OF THE INVENTION

This disclosure relates to display mounting brackets and, in particular, to mounting brackets for use with displays that do not include a VESA mounting pattern or other mounting structure.

BACKGROUND

Some displays, such as computer monitors, include a VESA mounting pattern on the back of the display that allows the display to be attached to a VESA standard mounting bracket. The VESA standard mounting bracket attached to the display can then be used to mount the display to a mounting arm, a wall mount, or many other mounting structures. However, many displays, such as televisions, do not include a VESA mounting pattern, or any other mounting structure, on the display. Therefore, there is a need for a mounting bracket that can be used with displays that do not include a VESA mounting pattern, or any other mounting structure, on the display to be able to mount the displays to a mounting arm, a wall mount, or other mounting structure.

SUMMARY

In accordance with one exemplary aspect of the present invention, a display mounting bracket includes a horizontal mounting arm, a mounting plate attached to the horizontal mounting arm, a vertical bottom mounting arm attached to the horizontal mounting arm, and a vertical top mounting arm attached to the horizontal mounting arm. The vertical bottom mounting arm is movable and positionable at multiple positions along a longitudinal axis of the horizontal mounting arm. A first display bracket is attached to a lower end of the vertical bottom mounting arm and a second display bracket is attached to an upper end of the vertical top mounting arm. A first compression pad is movably secured to the vertical bottom mounting arm and a second compression pad is movably secured to the vertical top mounting arm.

In further accordance with any one or more of the foregoing exemplary aspects of the present invention, the display mounting bracket may further include, in any combination, any one or more of the following preferred forms.

In one preferred form, a second vertical bottom mounting arm is attached to the horizontal mounting arm, a third display bracket is attached to a lower end of the second vertical bottom mounting arm, and a third compression pad is movably secured to the second vertical bottom mounting arm. The second vertical bottom mounting arm is movable and positionable at multiple positions along the longitudinal axis of the horizontal mounting arm.

In another preferred form, the horizontal mounting arm comprises a pair of opposing protrusions configured to receive the mounting plate and an aperture configured to receive a threaded member to secure the mounting plate to the horizontal mounting arm.

In another preferred form, the mounting plate is configured to be attached to a VESA standard compliant mounting plate.

In another preferred form, the horizontal mounting arm comprises a plurality of slots formed in an edge of the horizontal mounting arm and spaced apart along the longitudinal axis of the horizontal mounting arm. The vertical bottom mounting arm comprises a first plurality of protrusions that are spaced apart along a longitudinal axis of the vertical bottom mounting arm and are configured to engage the plurality of slots in the horizontal mounting arm such that the vertical bottom mounting arm is positionable at multiple positions along the longitudinal axis of the horizontal mounting arm and at multiple positions along the longitudinal axis of the vertical bottom mounting arm.

In another preferred form, the vertical bottom mounting arm is secured to the horizontal mounting arm by a threaded member extending through an aperture in the horizontal mounting arm and threaded into a threaded aperture in the vertical bottom mounting arm.

In another preferred form, the vertical top mounting arm is secured to the horizontal mounting arm by one or more threaded members that extend through a slot in the vertical top mounting arm and are threaded into threaded apertures in the horizontal mounting arm.

In another preferred form, the first and second display brackets have a body portion and a flange that extends generally orthogonal to the body portion.

In another preferred form, the first display bracket is positionable in multiple positions to adjust a distance between the vertical bottom mounting arm and the flange of the first display bracket and the second display bracket is positionable in multiple positions to adjust a distance between the vertical top mounting arm and the flange of the second display bracket.

In another preferred form, the first display bracket is rotatable relative to the longitudinal axis of the vertical bottom mounting arm and the second display bracket is rotatable relative to the longitudinal axis of the vertical top mounting arm.

In another preferred form, the first compression pad is movably secured to the vertical bottom mounting arm through a first threaded post that is threaded into a threaded aperture in the vertical bottom mounting arm such that a distance between the vertical bottom mounting arm and the first compression pad is adjustable and the second compression pad is movably secured to the vertical top mounting arm through a second threaded post that is threaded into a threaded aperture in the vertical top mounting arm such that a distance between the vertical top mounting arm and the second compression pad is adjustable.

In another preferred form, the first and second compression pads are attached to the first and second threaded posts through ball joints.

In accordance with another exemplary aspect of the present invention, a method of mounting a display includes the steps of: positioning a vertical bottom mounting arm and a second vertical bottom mounting arm horizontally along a horizontal mounting arm, wherein a distance between the vertical bottom mounting arm and the second vertical bottom mounting arm is determined based on a width of the display; positioning a vertical top mounting arm horizontally along the horizontal mounting arm and between the vertical bottom mounting arm and the second vertical bottom mounting arm; attaching a first display bracket to a lower end of the vertical bottom mounting arm and a second display bracket to a lower end of the second vertical bottom mounting arm such that a flange of each of the display brackets is spaced apart from the vertical bottom mounting arm and the second vertical bottom mounting arm by a distance that is greater than a depth of the display and the flanges are parallel or tangent to a front surface of the display and attaching a third display bracket to an upper end of the vertical top mounting arm such that a flange of the third display bracket is spaced apart from the vertical top mounting arm by a distance that is greater than the depth of the display and the flange is parallel or tangent to the front surface of the display; adjusting the vertical bottom mounting arm and the vertical top mounting arm vertically relative to the horizontal mounting arm such that the horizontal mounting arm is generally centered vertically between the first and second display brackets and the third display bracket and attaching the vertical bottom mounting arm, the second vertical bottom mounting arm, and the vertical top mounting arm to the horizontal mounting arm; positioning the display between the first and second display brackets and the third display bracket; adjusting a plurality of compression pads movably secured to the vertical mounting arm, the second vertical mounting arm, and the vertical top mounting arm to secure the display between the plurality of compression pads and the flanges of the first, second, and third display brackets; and attaching the horizontal mounting arm to a mounting plate.

In further accordance with any one or more of the foregoing exemplary aspects of the present invention, the method of mounting a display may further include, in any combination, any one or more of the following preferred forms.

In one preferred form, the vertical bottom mounting arm and the second bottom vertical mounting arm are positioned horizontally along the horizontal mounting arm and vertically relative to the horizontal mounting arm by inserting a protrusion of a plurality of protrusions on the vertical bottom mounting arm into a first slot of a plurality of slots formed in an edge of the horizontal mounting arm and inserting a protrusion of a plurality of protrusions on the second vertical bottom mounting arm into a second slot of the plurality of slot in the horizontal mounting arm.

In another preferred form, the plurality of protrusions on the vertical bottom mounting arm are spaced apart along a longitudinal axis of the vertical bottom mounting arm, the plurality of protrusions on the second vertical bottom mounting arm are spaced apart along a longitudinal axis of the second vertical bottom mounting arm, and the plurality of slots spaced apart along a longitudinal axis of the horizontal mounting arm.

In another preferred form, the vertical bottom mounting arm and the second vertical mounting arm are attached to the horizontal mounting arm by inserting threaded members through apertures formed in the horizontal mounting arm and threading the threaded members into threaded apertures formed in the vertical bottom mounting arm and the second vertical mounting arm.

In another preferred form, the first and second display brackets are attached to the lower ends of the vertical bottom mounting arm and the second vertical bottom mounting arm by inserting threaded members through a selected aperture of a plurality of apertures in each of the first and second display brackets and threading the threaded members into threaded apertures in the first ends of the vertical bottom mounting arm and the second vertical bottom mounting arm and the third display bracket is attached to the upper end of the vertical top mounting arm by inserting a threaded member through a selected aperture of a plurality of apertures in the third display bracket and threading the threaded member into a threaded aperture in the first and end of the vertical top mounting arm.

In another preferred form, the plurality of compression pads are movably secured to the vertical bottom mounting arm, the second vertical bottom mounting arm, and the vertical top mounting arm by threaded posts that are threaded into threaded apertures in the vertical bottom mounting arm, the second vertical bottom mounting arm, and the vertical top mounting arm and a distance between the vertical bottom mounting arm, the second vertical bottom mounting arm, and the vertical top mounting arm and the plurality of compression pads is adjustable by rotating the threaded posts within the threaded apertures in the vertical bottom mounting arm, the second vertical bottom mounting arm, and the vertical top mounting arm.

In another preferred form, the horizontal mounting arm is attached to the mounting plate by inserting the mounting plate between a pair of opposing protrusions in the horizontal mounting arm, inserting a threaded member through an aperture in the mounting plate, and threading the threaded member into a threaded aperture in the horizontal mounting arm.

In accordance with another exemplary aspect of the present invention, a display mounting bracket includes a horizontal mounting arm, a mounting plate attached to the horizontal mounting arm, and a vertical bottom mounting arm attached to the horizontal mounting arm with a means for positioning the vertical bottom mounting arm horizontally along the horizontal mounting arm and vertically relative to the horizontal mounting arm, and a vertical top mounting arm attached to the horizontal mounting arm with a means for positioning the vertical top mounting arm vertically relative to the horizontal mounting arm. A first display bracket is attached to a lower end of the vertical bottom mounting arm with a means for adjusting a distance between a flange of the first display bracket and the vertical bottom mounting arm. A second display bracket is attached to an upper end of the vertical top mounting arm with a means for adjusting a distance between a flange of the second display bracket and the vertical top mounting arm. A first compression pad is movably secured to the vertical bottom mounting arm with a means for adjusting a distance between the first compression pad and the vertical bottom mounting arm. A second compression pad is movably secured to the vertical top mounting arm and a means for adjusting a distance between the second compression pad and the vertical top mounting arm.

In accordance with another exemplary aspect of the present invention, a display mounting bracket includes a horizontal mounting arm, a mounting plate attached to the horizontal mounting arm, a vertical bottom mounting arm attached to the horizontal mounting arm, a second vertical bottom mounting arm attached to the horizontal mounting arm, a vertical top mounting arm attached to the horizontal mounting arm, a first display bracket attached to a lower end of the vertical bottom mounting arm and a lower end of the second vertical bottom mounting arm, a second display bracket attached to an upper end of the vertical top mounting arm, a first compression pad movably secured to the vertical bottom mounting arm, a second compression pad movably secured to the vertical top mounting arm, and a third compression pad movably secured to the second vertical bottom mounting arm. The vertical bottom mounting arm and the second vertical bottom mounting arm are each movable and positionable at multiple positions along a longitudinal axis of the horizontal mounting arm.

In further accordance with any one or more of the foregoing exemplary aspects of the present invention, the display mounting bracket may further include, in any combination, any one or more of the following preferred forms.

In one preferred form, the horizontal mounting arm comprises a plurality of slots formed in an edge of the horizontal mounting arm and spaced apart along the longitudinal axis of the horizontal mounting arm. The vertical bottom mounting arm and the second vertical bottom mounting arm each comprise a first plurality of protrusions spaced apart along a longitudinal axis of the vertical bottom mounting arm and the second vertical bottom mounting arm, the first plurality of protrusions configured to engage the plurality of slots in the horizontal mounting arm such that the vertical bottom mounting arm and the second vertical bottom mounting arm are positionable at multiple positions along the longitudinal axis of the horizontal mounting arm and at multiple positions along the longitudinal axis of the vertical bottom mounting arm and the second vertical bottom mounting arm.

In another preferred form, the first and second display brackets have a body portion and a flange that extends generally orthogonal to the body portion. The first display bracket is positionable in multiple positions to adjust a distance between the vertical bottom mounting arm and the second vertical bottom mounting arm and the flange of the first display bracket and the second display bracket is positionable in multiple positions to adjust a distance between the vertical top mounting arm and the flange of the second display bracket.

BRIEF DESCRIPTION OF THE DRAWINGS

The Figures described below depict various aspects of the systems, devices, and/or methods disclosed therein. It should be understood that each Figure depicts an embodiment of a particular aspect of the disclosed systems, devices, and/or methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

Figure 1:
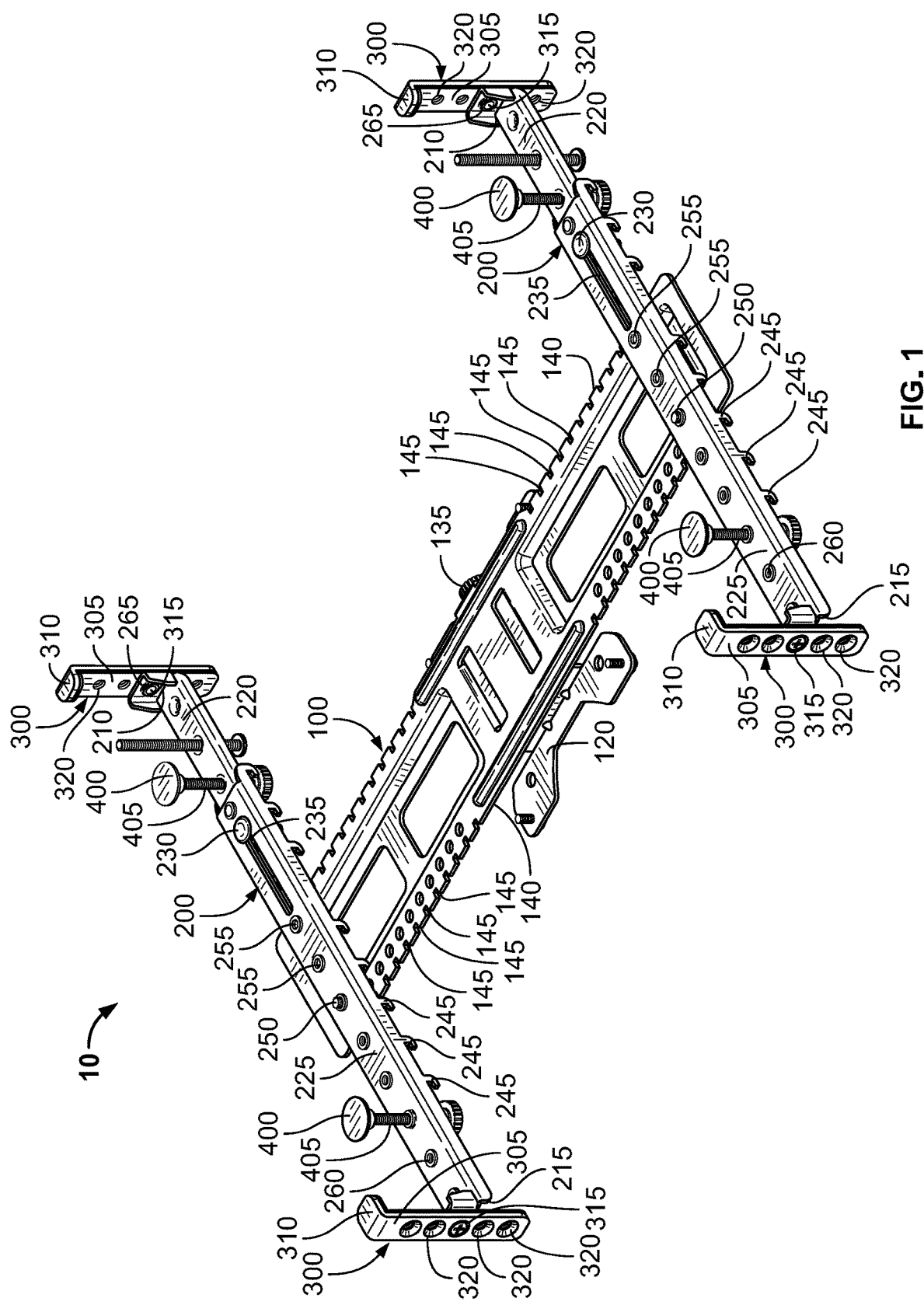
FIG. 1 is a perspective view of an example display mounting bracket.
Figure 2:
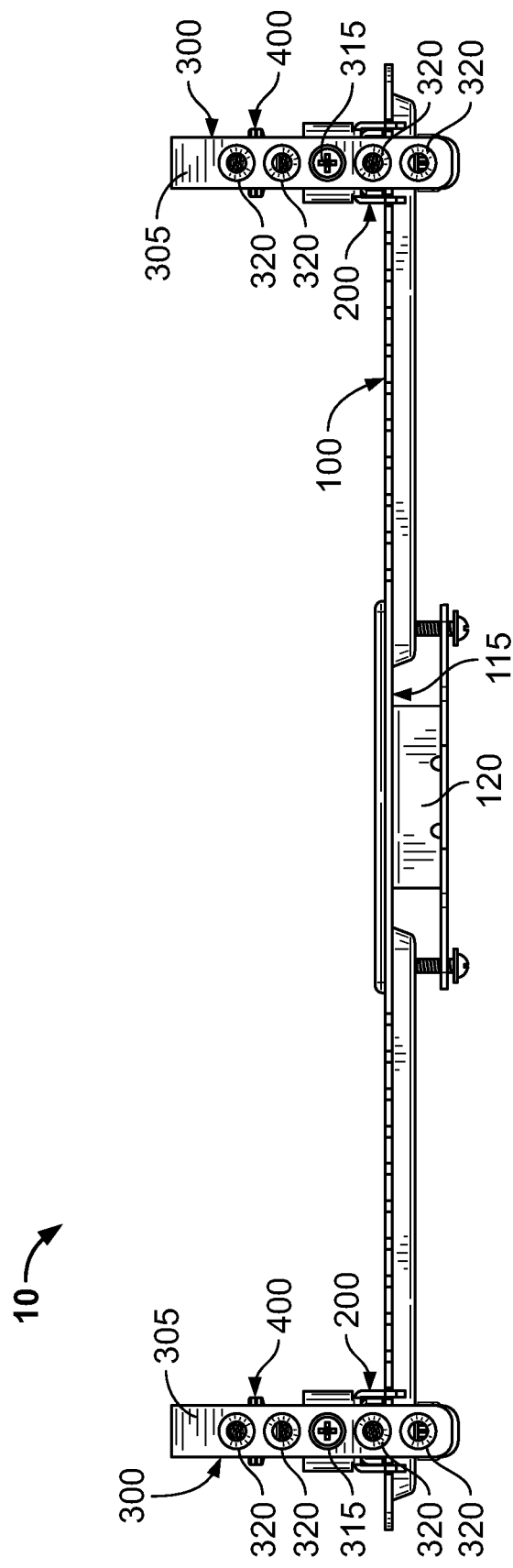
FIG. 2 is a top view of the example display mounting bracket of FIG. 1.
Figure 3:
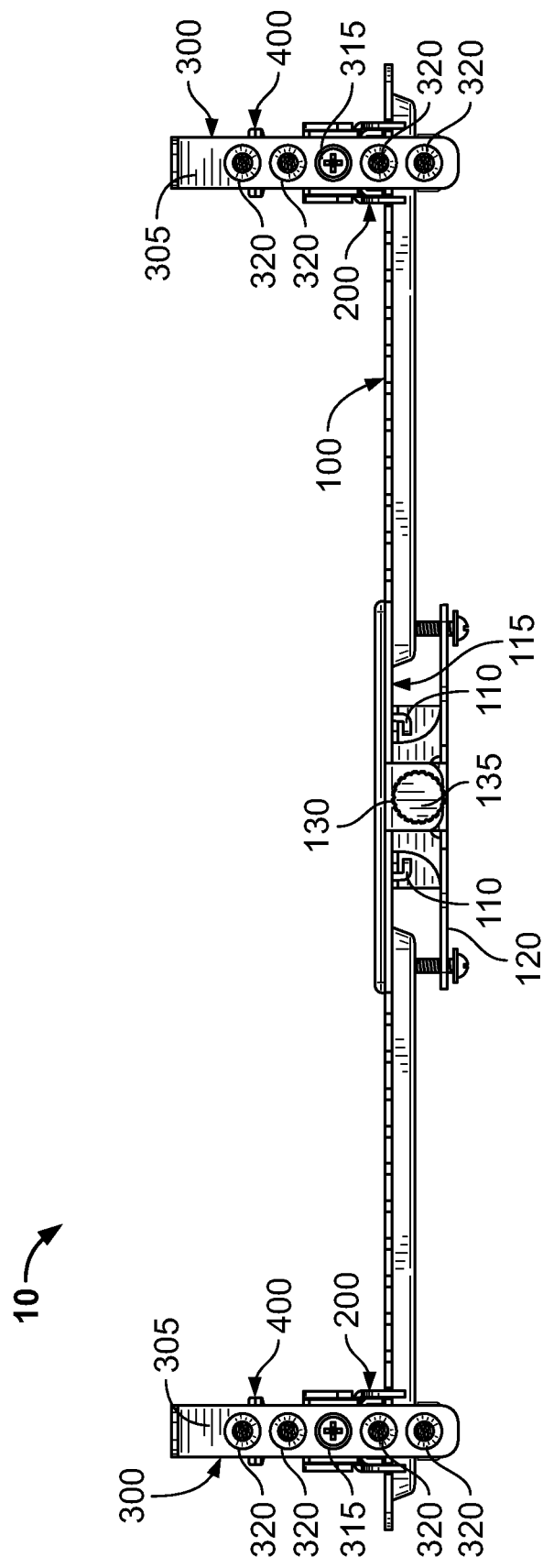
FIG. 3 is a bottom view of the example display mounting bracket of FIG. 1.
Figure 4:
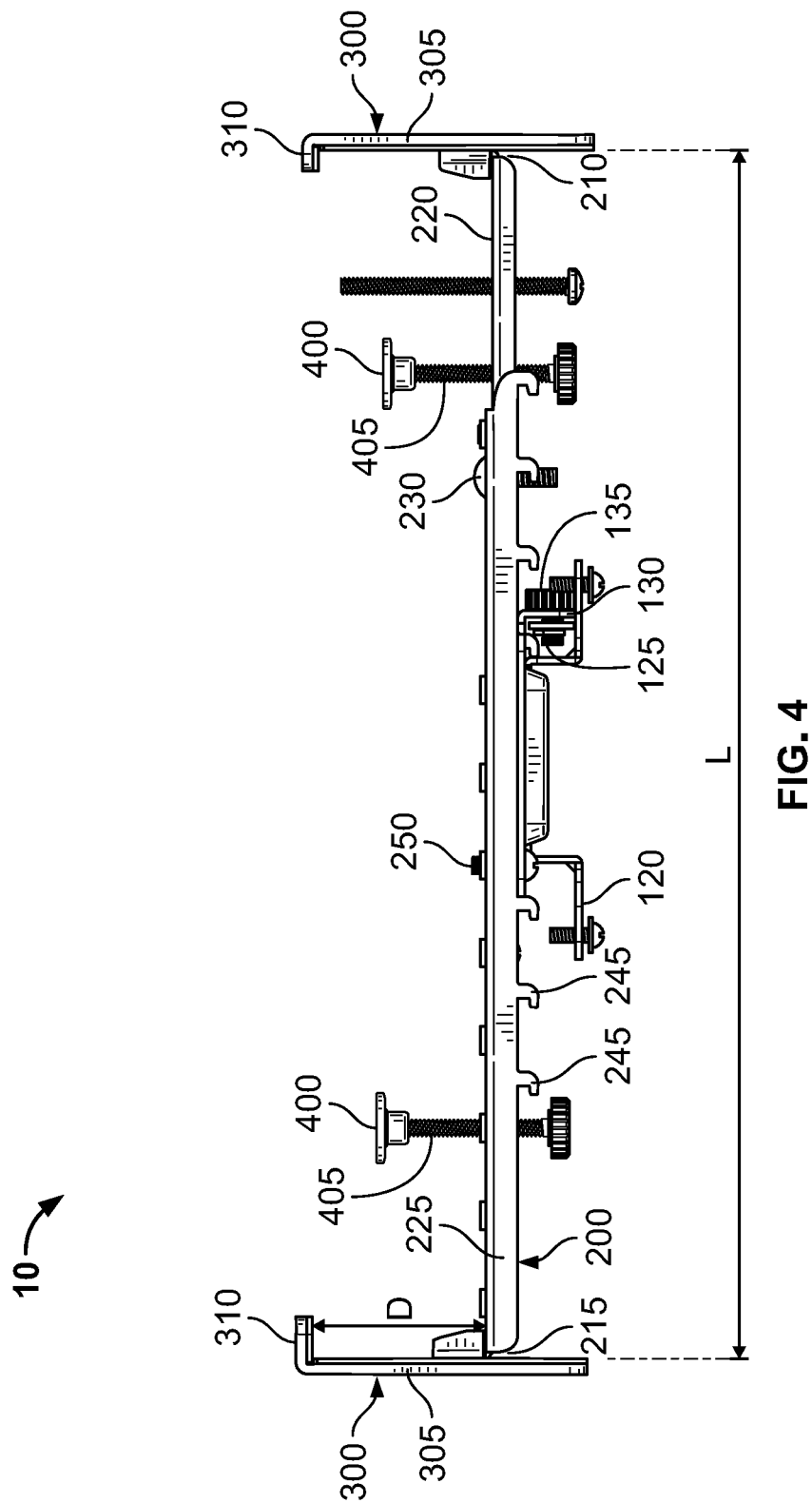
FIG. 4 is a left-side view of the example display mounting bracket of FIG. 1.
Figure 5:
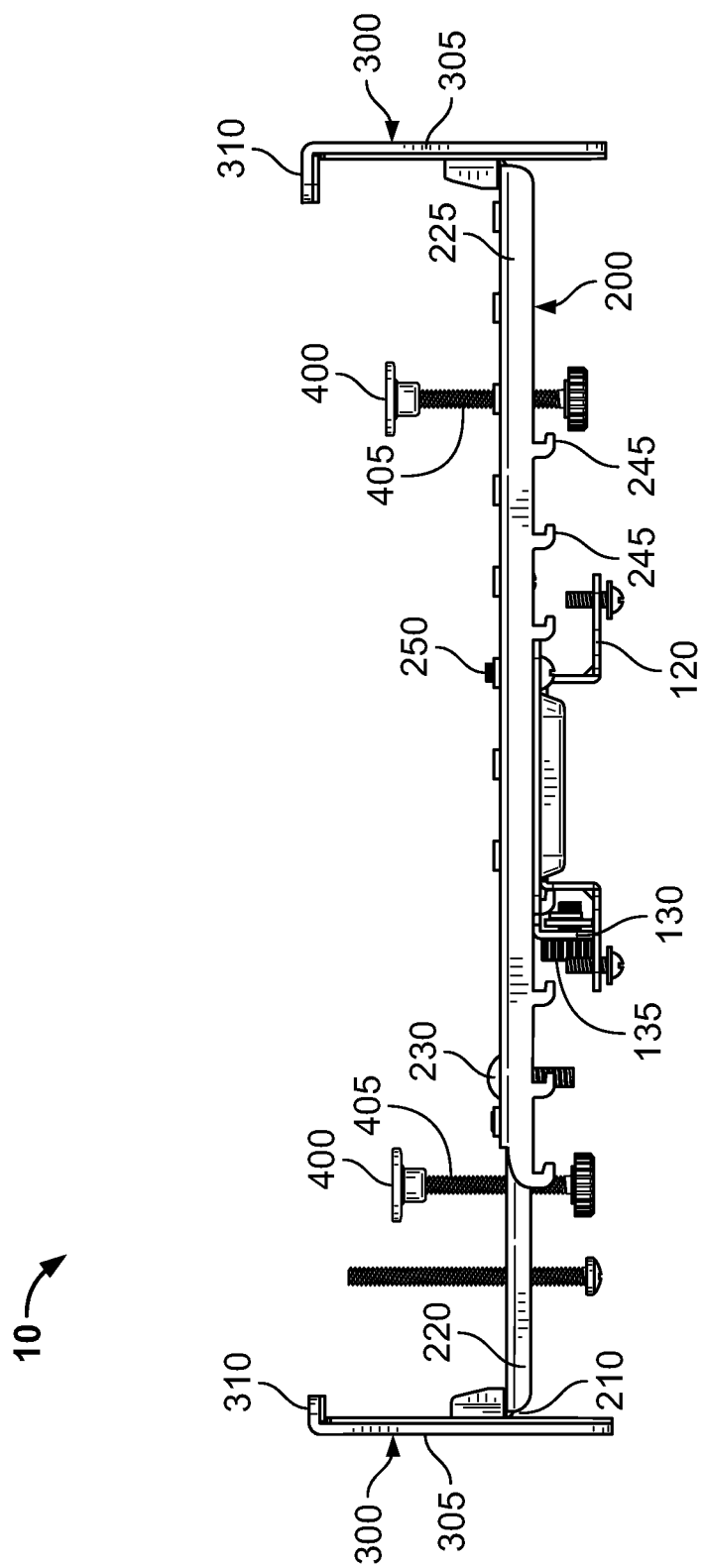
FIG. 5 is a right-side view of the example display mounting bracket of FIG. 1.
Figure 6:
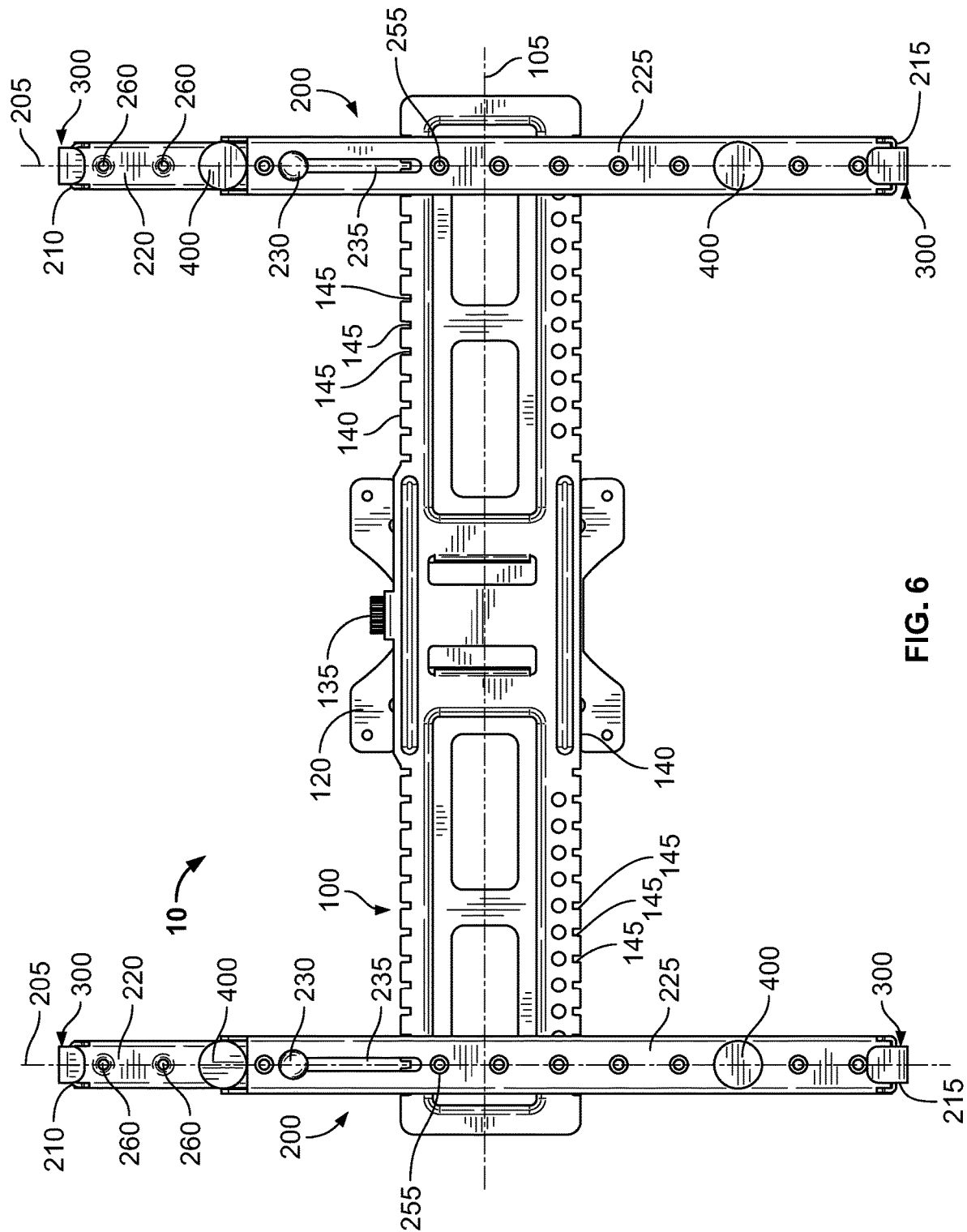
FIG. 6 is a front view of the example display mounting bracket of FIG. 1.
Figure 7:
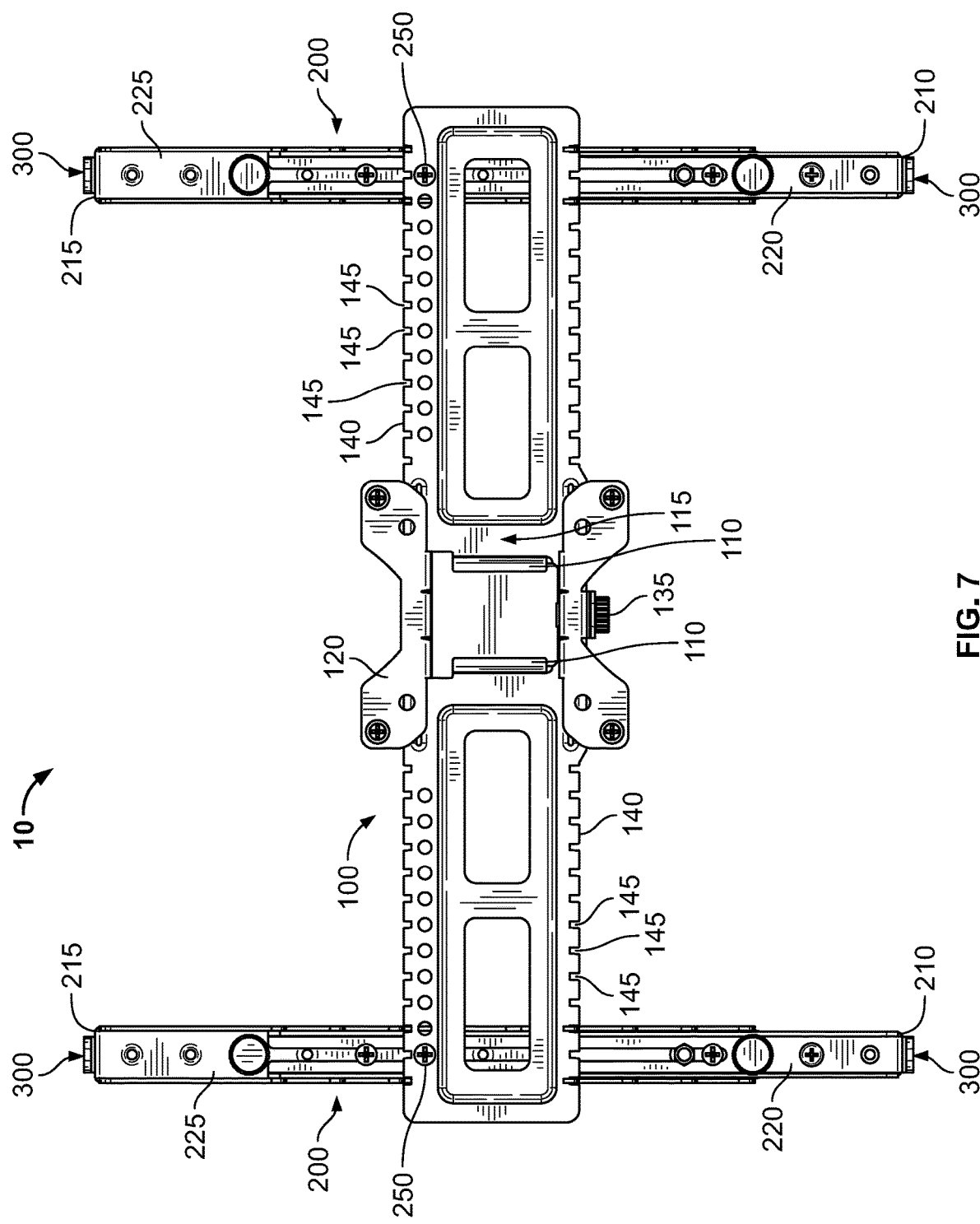
FIG. 7 is a rear view of the example display mounting bracket of FIG. 1.
Figure 8:
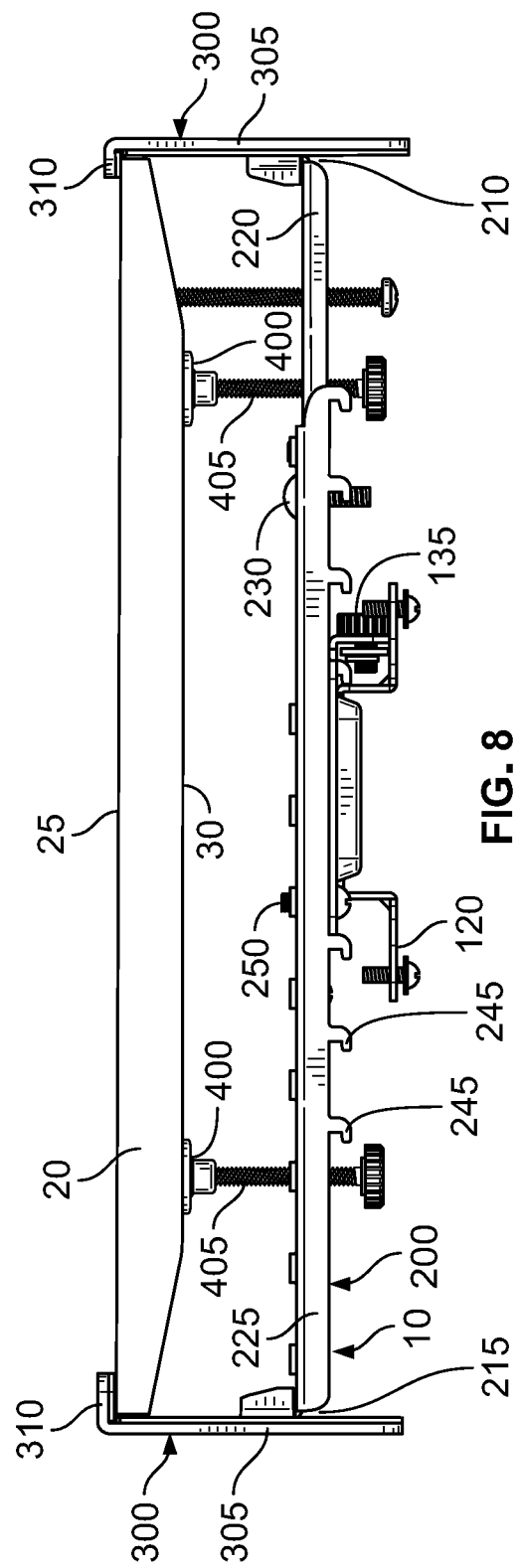
FIG. 8 is a left-side view of the example display mounting bracket of FIG. 1 with a display mounted in the example display mounting bracket.
Figure 9:
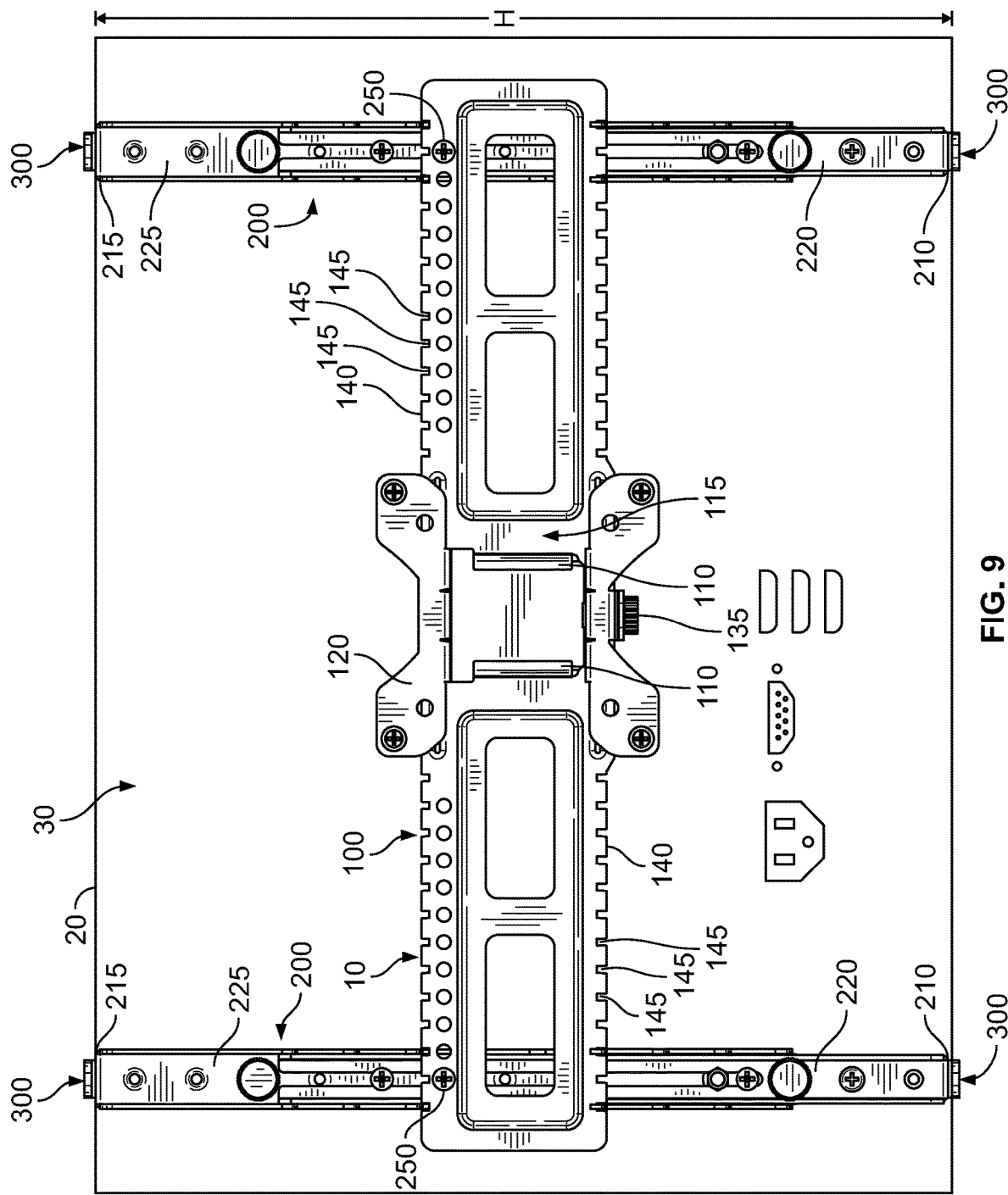
FIG. 9 is a rear view of the example display mounting bracket and display of FIG. 8.
Figure 10:
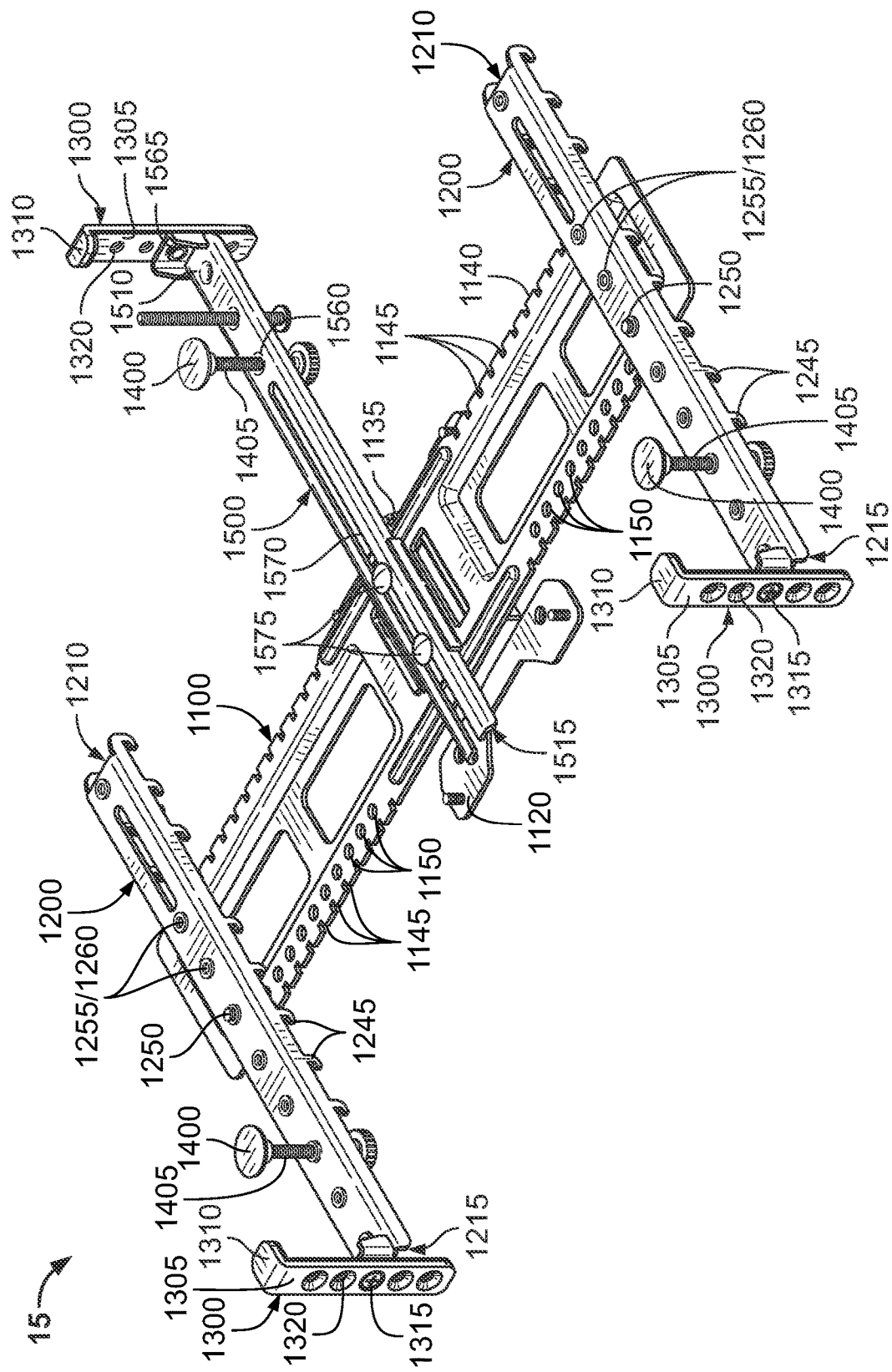
FIG. 10 is a perspective view of a second example display mounting bracket.
Figure 11:
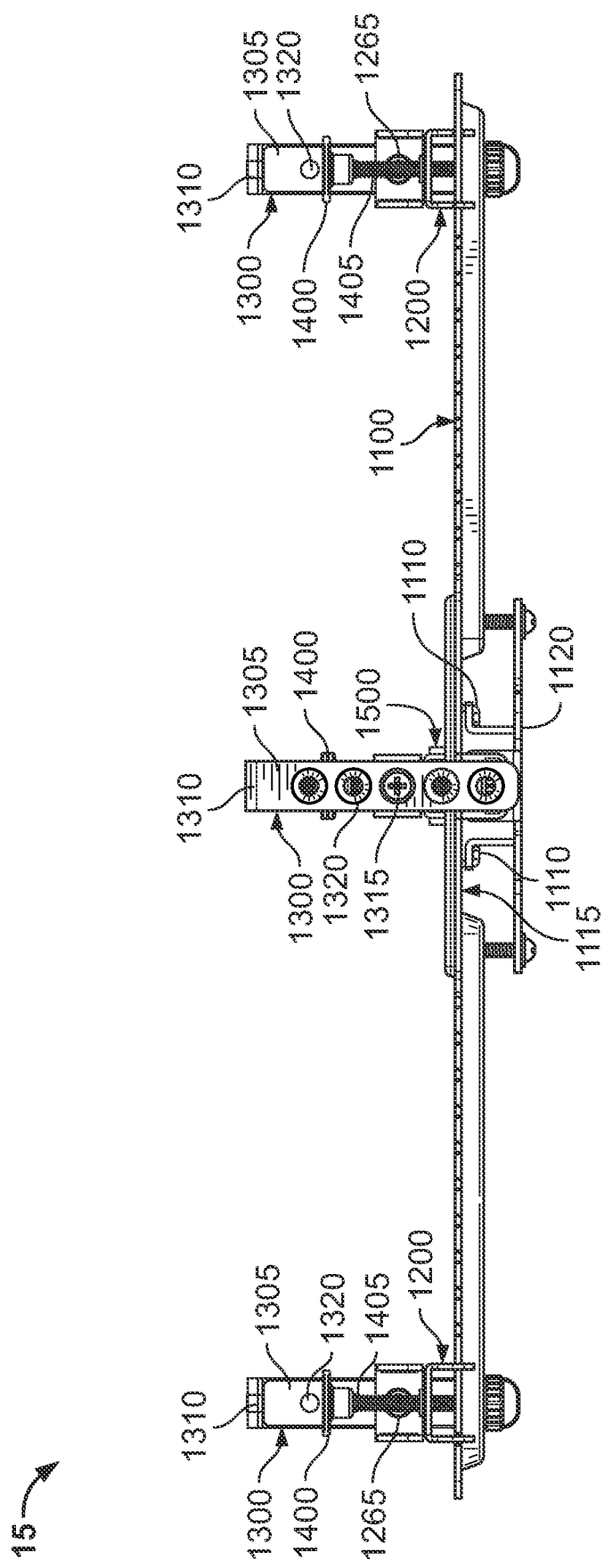
FIG. 11 is a top view of the display mounting bracket of FIG. 10.
Figure 12:
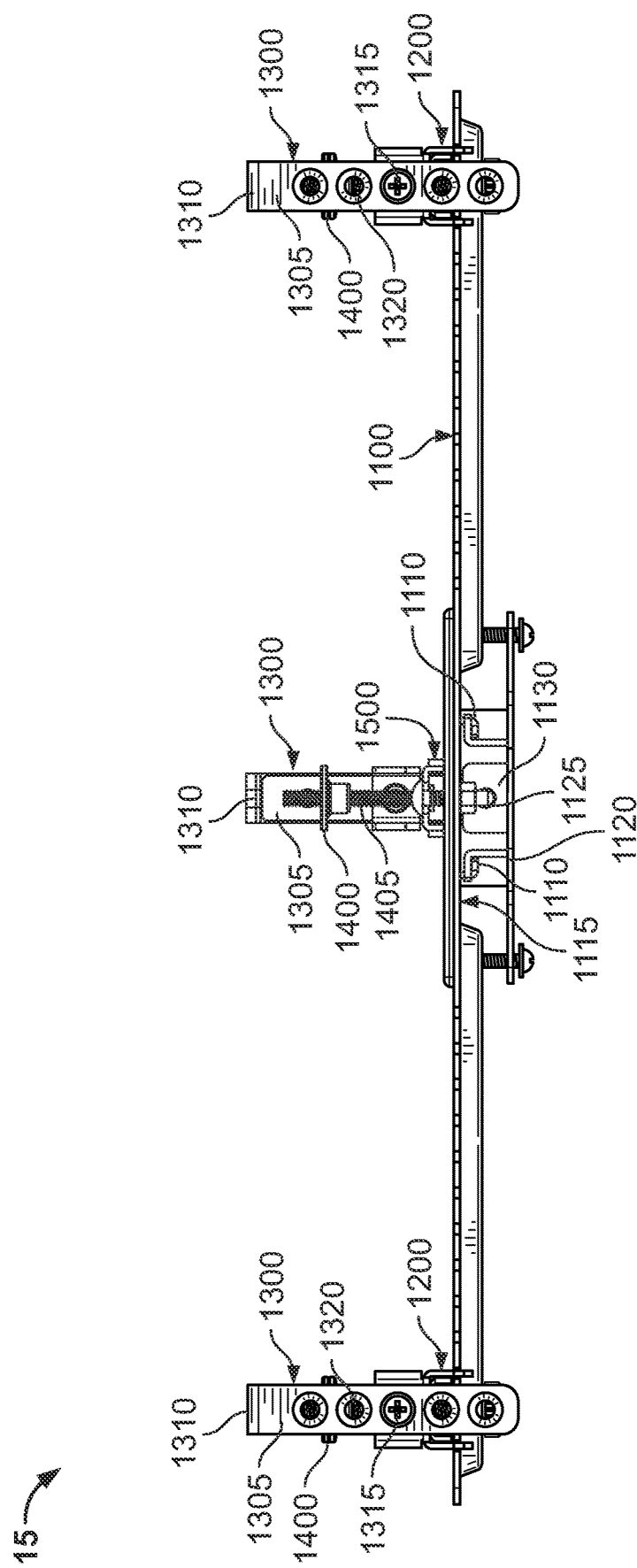
FIG. 12 is a bottom view of the display mounting bracket of FIG. 10.
Figure 13:
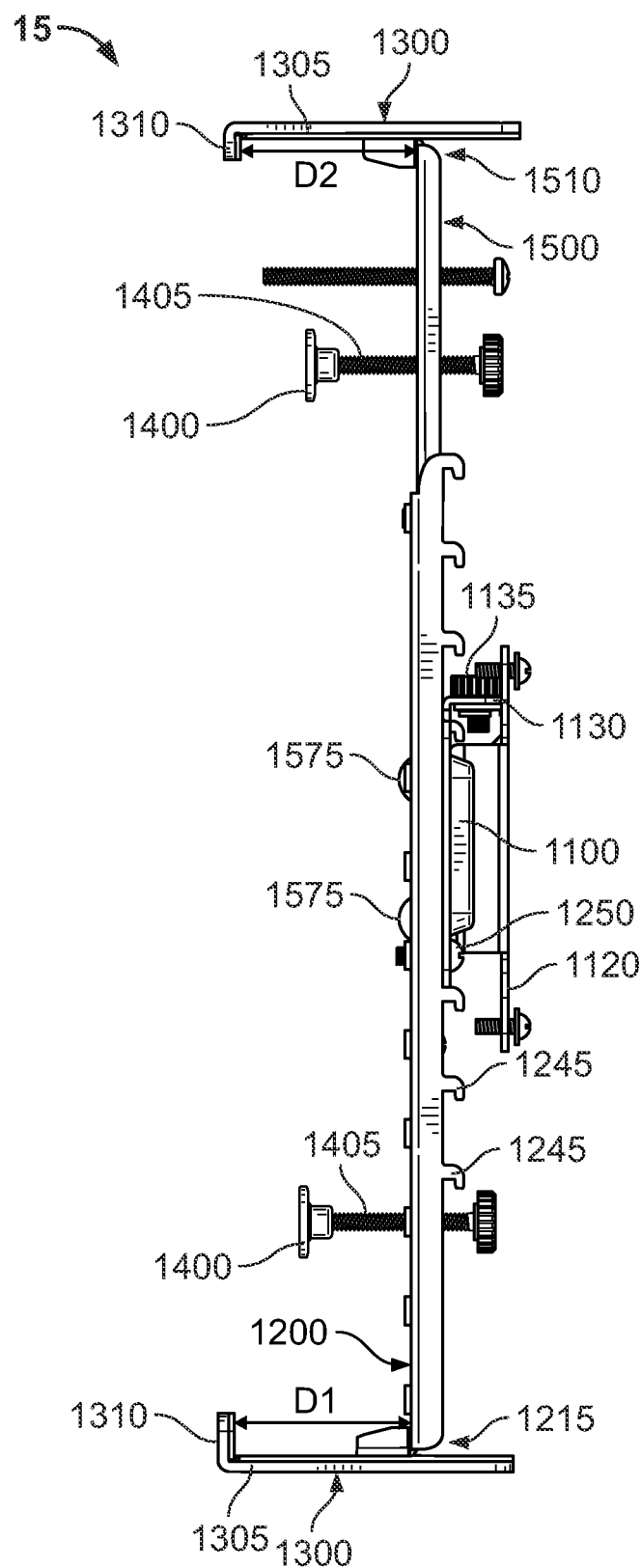
FIG. 13 is a left side view of the display mounting bracket of FIG. 10.
Figure 14:
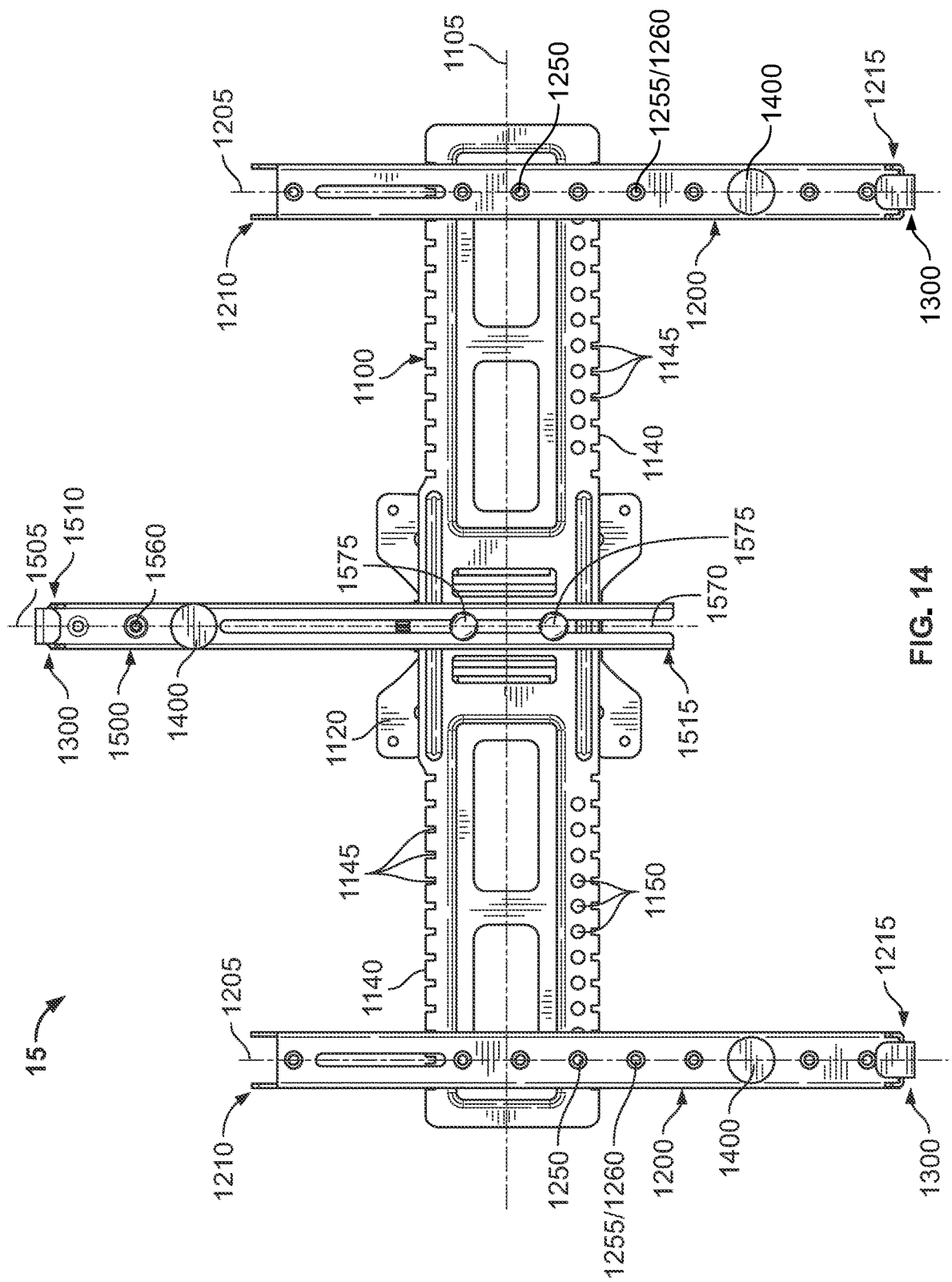
FIG. 14 is a front view of the display mounting bracket of FIG. 10.
Figure 15:
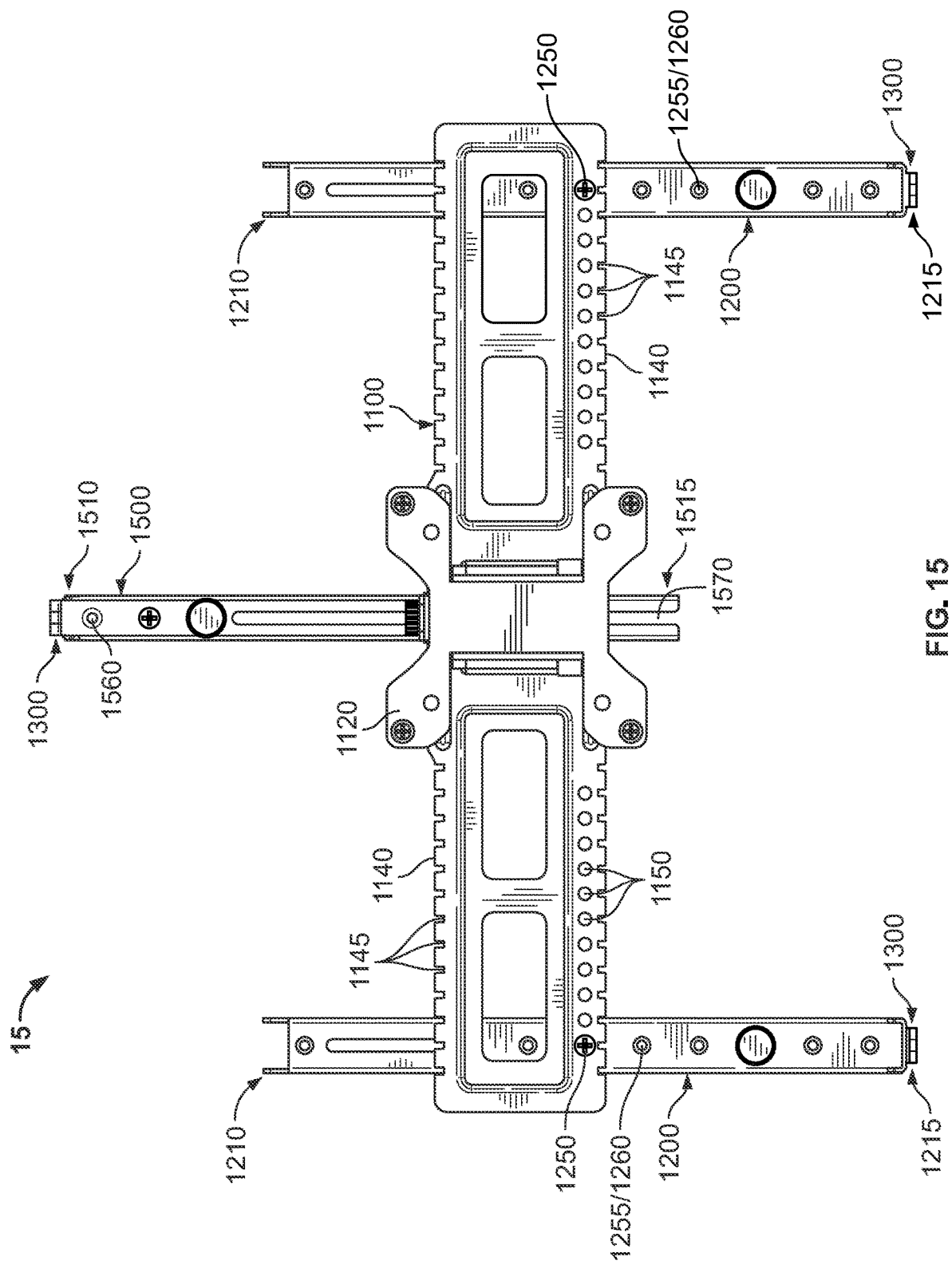
FIG. 15 is a rear view of the display mounting bracket of FIG. 10.
Figure 16:
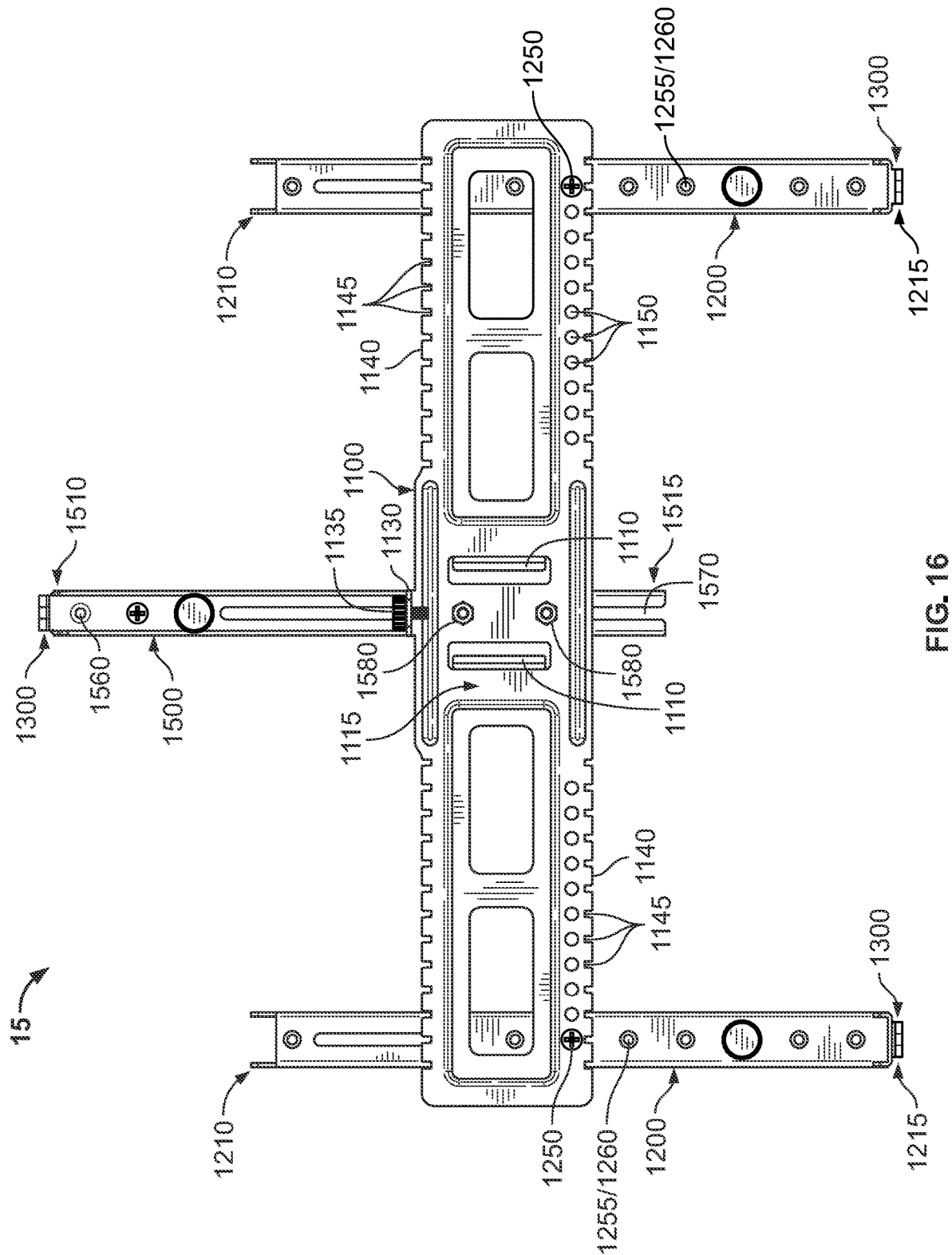
FIG. 16 is a rear view of the display mounting bracket of FIG. 10 with the mounting plate removed.
Figure 17:
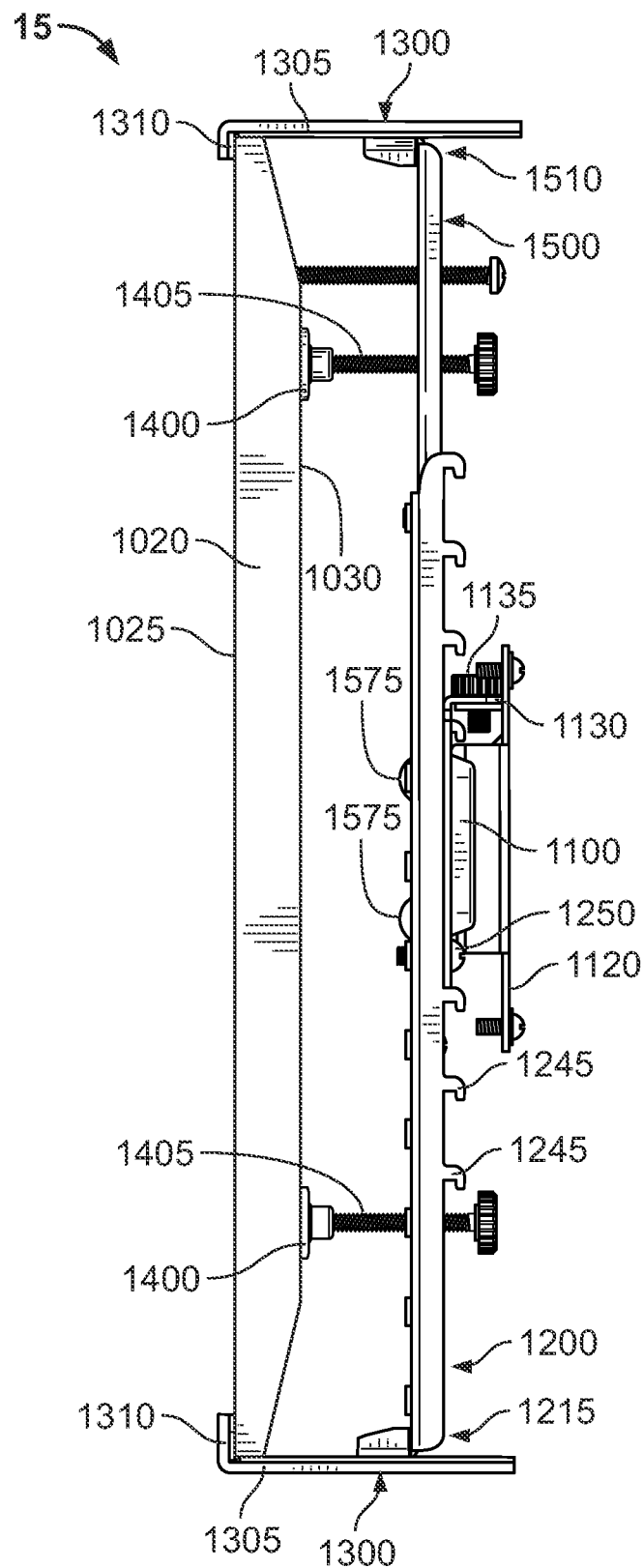
FIG. 17 is a left side view of the display mounting bracket of FIG. 10 with a display mounted in the display mounting bracket.
Figure 18:
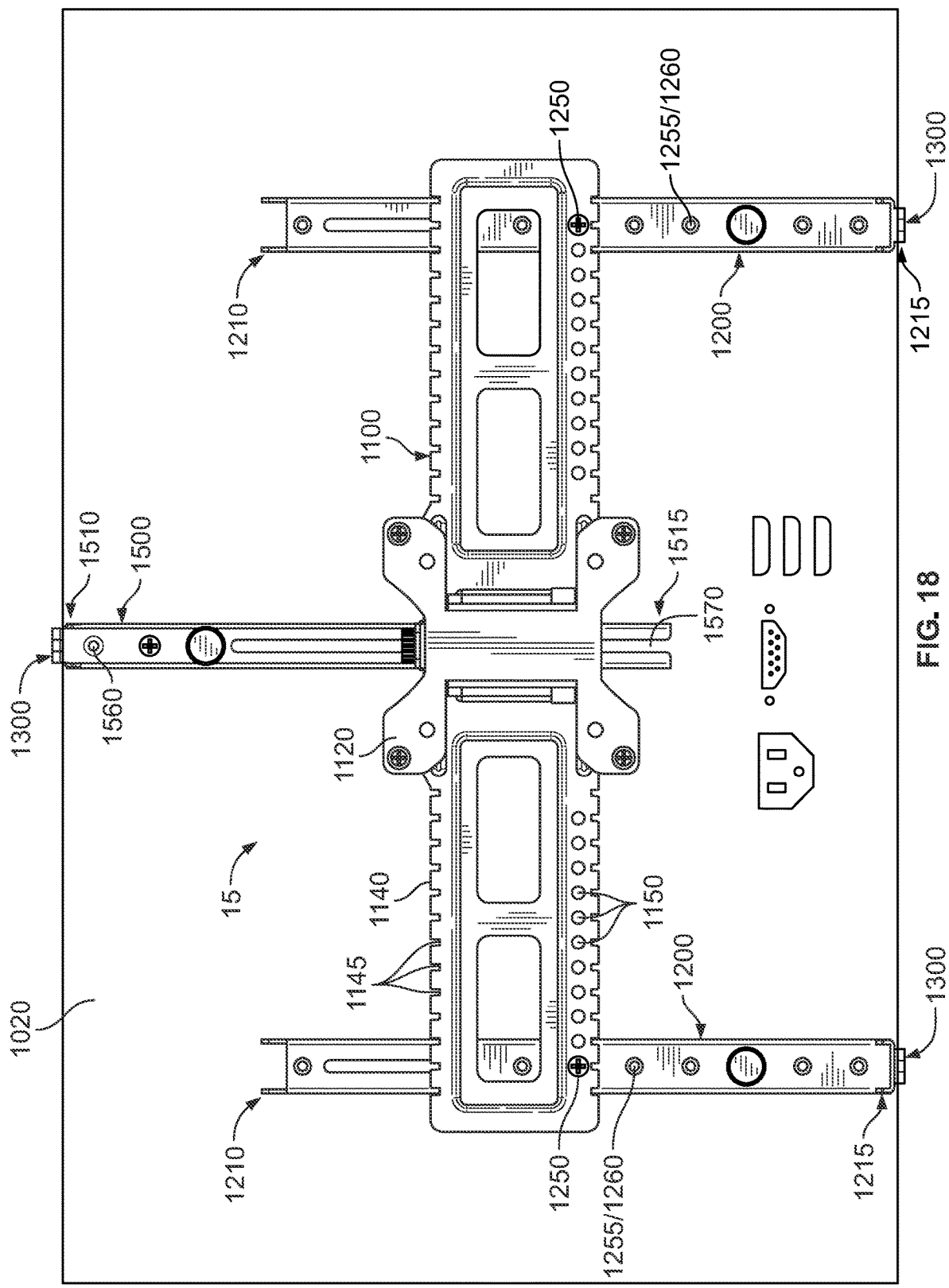
FIG. 18 is a rear view of the display mounting bracket of FIG. 17.

The Figures depict preferred embodiments for purposes of illustration only. Alternative embodiments of the systems and methods illustrated herein may be employed without departing from the principles of the invention described herein.

DETAILED DESCRIPTION

The embodiments shown and described herein provide display mounting brackets that fit and can be used with all display types, shapes, and sizes, including displays that do not include VESA compatible mounting capabilities, displays that have curved front panels, displays that have irregularly shaped back panels, etc.

Referring to FIGS. 1-9, a first example display mounting bracket 10 is shown and generally includes a horizontal mounting arm 100, vertical mounting arms 200 attached to horizontal mounting arm 100, display brackets 300 attached to opposing ends of vertical mounting arms 200, and compression pads 400 movably secured to vertical mounting arms 200.

In the example shown, horizontal mounting arm 100 is an elongated, generally planar member having a longitudinal axis 105. A pair of opposing protrusions 110 extend from a back surface 115 of horizontal mounting arm 100 and are configured to receive mounting plate 120, which can be configured to be attached to another VESA standard compliant mounting plate or configured to be attached to any other type mounting plate or surface desired. Alternatively, rather than protrusions 110, mounting plate 120 can be secured to horizontal mounting arm 100 in any appropriate manner desired, such as with screws, nuts and bolts, etc. As shown, protrusions 110 are generally L-shaped and are configured to receive a planar portion of mounting plate 120 between protrusions 110, but can be any size, shape, or configuration desired to receive a particular mounting plate. An aperture 125 is formed in a tab 130 extending orthogonal from back surface 115 of horizontal mounting arm 100 and is configured to receive threaded member 135 that threads into a threaded aperture in mounting plate 120 to attach and secure mounting plate 120 to horizontal mounting arm 100. A plurality of slots 145 are formed in opposing edges 140 of horizontal mounting arm 100 and are spaced apart in a direction parallel to longitudinal axis 105. As described in more detail below, slots 145 are configured to receive protrusions 245 extending from vertical mounting arms 200 to allow vertical mounting arms 200 to be positioned in multiple positions along horizontal mounting arm 100.

Each vertical mounting arm 200 extends along a longitudinal axis 205 and has an adjustable length L defined between a first end 210 and an opposing second end 215, which allows vertical mounting arms 200 to be adjusted to fit displays having various heights. Although any manner of adjusting length L of vertical mounting arms 200 can be employed, in the embodiment shown, length L of vertical mounting arms 200 is adjusted by sliding a generally U-shaped first arm member 220 along/within a generally U-shaped second arm member 225 to adjust the desired length L and then securing first arm member 220 to second arm member 225 by inserting a threaded member 230 through slot 235 in second arm member 225 and threading it into threaded aperture 240 in first arm member 220. Although two vertical mounting arms 200 are used in the embodiment shown, any number of vertical mounting arms 200 can be used depending on the size and weight of the display and the particular application.

Vertical mounting arms 200 are movable in relation to horizontal mounting arm 100 such that vertical mounting arms 200 are positionable at multiple positions along longitudinal axis 105 of horizontal mounting arm 100 and horizontal mounting arm 100 is positionable at multiple positions along longitudinal axis 205 of vertical mounting arms 200. The adjustability of horizontal mounting arm 100 along longitudinal axis 205 of vertical mounting arms 200 allows placement of horizontal mounting arm 100 at various positions relative to the center of display 20 to locate horizontal mounting arm 100 at an optimal mounting location and to avoid blocking any receptacles, ports (e.g., power, USB, HDMI, etc.), controls, etc. located on the back of display 20. Similarly, the adjustability of vertical mounting arms 200 along longitudinal axis 105 of horizontal mounting arm 100 allows placement of vertical mounting arms 200 to accommodate displays having different widths and at various positions along horizontal mounting arm 100 to locate vertical mounting arms 200 to avoid blocking any receptacles, ports (e.g., power, USB, HDMI, etc.), controls, etc. located on the back of display 20. To position vertical mounting arms 200 horizontally (along longitudinal axis 105) along horizontal mounting arm 100 and vertically (along longitudinal axes 205) relative to horizontal mounting arm 100 such that horizontal mounting arm 100 can be generally centered along length L of vertical mounting arms 200 or positioned along vertical mounting arms 200 at other desired positions to avoid blocking any receptacles, ports (e.g., power, USB, HDMI, etc.), controls, etc. located on the back of display 20, vertical mounting arms 200 have a plurality of protrusions 245 that are configured to engage slots 145 in horizontal mounting arm 100. Protrusions 245, which in the embodiment shown are formed as generally L-shaped hooks, extend from edges of vertical mounting arms 200 and are spaced apart along longitudinal axis 205 by a predetermined distance. The spacing of slots 145 along edge 140 of horizontal mounting arm 100 and the engagement of protrusions 245 in slots 145 allows vertical mounting arms 200 to be positioned at multiple positions horizontally along longitudinal axis 105 of horizontal mounting arm 100. In addition, the spacing of protrusions 245 along vertical mounting arms 200 allows horizontal mounting arm 100 to be positioned at multiple positions vertically along longitudinal axes 205 of vertical mounting arms 200. Once positioned, vertical mounting arms 200 can be attached and secured to horizontal mounting arm 100 by threaded members 250 that extend through apertures 150 in horizontal mounting arm and are threaded into threaded apertures 255 in vertical mounting arms 200, or in any way appropriate for a given application.

In the example shown, display brackets 300 have a body portion 305 and a flange 310 that extends generally orthogonal to body portion 305. Display brackets 300 can be attached to opposing first and second ends 210, 215 of vertical mounting arms 200 via threaded members 315 that extend through one of a plurality of apertures 320 in body portion 305 and are threaded into threaded apertures 265 in first and second ends 210, 215 of vertical mounting arms 200, or in any other manner appropriate. The plurality of apertures 320 spaced longitudinally along body portion 305 of display brackets 300 allow display brackets 300 to be positioned in multiple positions to adjust the distance D between vertical mounting arms 200 and flanges 310 of display brackets 300 to accommodate displays having different depths. Rather than a plurality of apertures 320, display brackets 300 can also have an elongated slot to receive threaded members 315. In addition, rather than display brackets 300 being attached to both first and second ends 210, 215, each vertical mounting arm 200 could have only a single display bracket 300 attached to only first end 210 or second end 215, if there are enough vertical mounting arms 200. For example, if there were four (4) vertical mounting arms 200, two outer vertical mounting arms 200 could have display brackets 300 attached to second ends 215 to support display 20 at the bottom and two inner vertical mounting arms 200 could have display brackets 300 attached to first ends 210 to support display 20 at the top. Display brackets 300 can also be attached to first and second ends 210, 215 of vertical mounting arms such that distance D is different at first end 210 and second end 215 for displays that may have differing depths at the top and bottom of the display. Attaching display brackets 300 via threaded members 315 also allows display brackets 300 to rotate relative to longitudinal axis 205 of vertical mounting arms 200 so that flanges 310 of display brackets 300 can be positioned parallel (for flat front displays) or tangent (for curved front displays) to front surface 25 of display 20.

Compression pads 400 engage back surface 30 of display 20 and are configured to bias or urge display 20 forward and into contact with flanges 310 of display brackets 300 to secure display 20. In the embodiment shown, there are four compression pads 400, two on each vertical mounting arm 200 and each corresponding to a respective display bracket 300. However, any number of compression pads can be used (e.g., one per vertical mounting arm or more than two per vertical mounting arm) so long as display 20 is sufficiently urged against flanges 310 of display brackets 300 to secure display 20. In the example shown, compression pads 400 are movably secured to vertical mounting arms 200 via threaded posts 405 that are connected to the back of compression pads 400 and are threaded into threaded apertures 260 in vertical mounting arms 200 such that the distance between vertical mounting arms 200 and compression pads 400 is adjustable. To adjust the distance between compression pads 400 and vertical mounting arms 200, threaded posts 405 can be rotated in a first direction (e.g., clockwise) to move compression pads 400 toward vertical mounting arms 200 or rotated in a second direction (e.g., counter-clockwise) to move compression pads 400 away from vertical mounting arms 200 an toward engagement with back surface 30 of display 20. Alternatively, can be moved to engage back surface 30 of display 20 in any other manner appropriate for a given application. For example, compression pads 40 could be mounted to a straight shaft that is received in vertical mounting arms 200 and could be biased forward with a compression spring. In the embodiment shown, compression pads 400 are rubber feet that can conform to back surface 30 of display 20 to allow compression pads 400 to be used with flat, angled, or curved back displays. Alternatively, compression pads 400 could also be made of a more rigid material and be connected to threaded posts 405 through ball joints, which would allow the more rigid compression pads to move to engage back surface 30 of display 20.

To mount a display 20 using the example display mounting bracket 10 length L of vertical mounting arms 200 is adjusted to correspond to a height H of display 20 by sliding first arm member 220 along/within second arm member 225 to obtain the desired length L and then securing first arm member 220 to second arm member 225 via threaded member 230.

Vertical mounting arms 200 are positioned horizontally along horizontal mounting arm 100, with the distance between vertical mounting arms determined based on the width of display 20. Preferably, vertical mounting arms 200 are positioned so that they do not block any receptacles, ports (e.g., power, USB, HDMI, etc.), controls, etc. located on the back of display 20 when display 20 is mounted in display mounting bracket 10 and such that display brackets 300 at opposing first and second ends 210, 215 of vertical mounting arms 200 are proximate the outer ends of display 20 to provide the greatest support. Vertical mounting arms 200 are also positioned vertically relative to horizontal mounting arm 100 so that horizontal mounting arm 100 does not block any receptacles, ports (e.g., power, USB, HDMI, etc.), controls, etc. located on the back of display 20 when display 20 is mounted in display mounting bracket 10 and is, preferably, generally centered along the length of vertical mounting arms 200. The respective protrusions 245 on vertical mounting arms 200 can then be inserted in a corresponding slot 145 in horizontal mounting arm 100 and vertical mounting arms 200 can be attached to horizontal mounting arm 100 via threaded members 250.

Display brackets 300 are attached to opposing first and second ends 210, 215 of vertical mounting arms 200 so that flanges 310 of display brackets 300 are spaced apart from vertical mounting arms 200 by distance D, which should be greater than the depth of display 20. The distance D can be determined based on which aperture 320 is used to receive threaded member 315. Display brackets 300 can also be rotated so that flanges 310 of display brackets 300 are parallel or tangent to front surface 25 of display 20 and secured to vertical mounting arms 200 via threaded members 315.

Display 20 can then be positioned between display brackets 300 and compression pads 400 can be adjusted by rotating threaded posts 405 until compression pads engage back surface 30 of display and front surface 25 of display 20 engages flanges 310 of display brackets 300 to secure display 20 between compression pads 400 and flanges 310.

Once display 20 is secured, horizontal mounting arm 100 can be attached to mounting plate 120.

Referring to FIGS. 10-19, a second example display mounting bracket 15 is shown and generally includes a horizontal mounting arm 1100, at least one vertical bottom mounting arm 1200 attached to horizontal mounting arm 1100, at least one vertical top mounting arm 1500 attached to horizontal mounting arm 100, display brackets 1300 attached to vertical bottom mounting arms 1200 and vertical top mounting arms 1500, and compression pads 1400 movably secured to vertical bottom mounting arms 1200 and vertical top mounting arms 1500.

In the example shown, horizontal mounting arm 1100 is an elongated, generally planar member having a longitudinal axis 1105. A pair of opposing protrusions 1110 extend from a back surface 1115 of horizontal mounting arm 1100 and are configured to receive a mounting plate 1120, which can be configured to be attached to another VESA standard compliant mounting plate or configured to be attached to any other type mounting plate or surface desired. Alternatively, rather than protrusions 1110, mounting plate 1120 can be attached to horizontal mounting arm 1100 in any appropriate manner desired, such as with screws, nuts and bolts, etc. As shown, protrusions 1110 are generally L-shaped and are configured to receive a planar portion of mounting plate 1120 between protrusions 1110, but can be any size, shape, or configuration desired to receive a particular mounting plate. An aperture 1125 is formed in a tab 1130 extending orthogonal from back surface 1115 of horizontal mounting arm 1100 and is configured to receive a threaded member 1135 that threads into a threaded aperture in mounting plate 1120 to attach and secure mounting plate 1120 to horizontal mounting arm 1100. A plurality of slots 1145 are formed in one or both opposing edges 1140 of horizontal mounting arm 1100 and are spaced apart in a direction parallel to longitudinal axis 1105. As described in more detail below, slots 1145 are configured to receive protrusions 1245 extending from vertical bottom mounting arms 1200 to allow vertical bottom mounting arms 1200 to be positioned in multiple positions along horizontal mounting arm 1100.

Two vertical bottom mounting arms 1200 are shown in the example of FIGS. 10-19, however, any number of vertical bottom mounting arms 1200 can be used depending on the size and weight of the display and the particular application. Each vertical bottom mounting arm 1200 is identical and each extends along a longitudinal axis 1205 between an upper end 1210 and an opposing lower end 1215 and, along with display brackets 1300, are used to support a bottom of a display 1020.

Vertical bottom mounting arms 1200 are movable in relation to horizontal mounting arm 1100 such that vertical bottom mounting arms 1200 are positionable at multiple positions along longitudinal axis 1105 of horizontal mounting arm 1100 and horizontal mounting arm 1100 is positionable at multiple positions along longitudinal axis 1205 of vertical bottom mounting arms 1200. The adjustability of vertical bottom mounting arms 1200 along longitudinal axis 1105 of horizontal mounting arm 1100 allows placement of vertical bottom mounting arms 1200 to accommodate displays having different widths and at various positions along horizontal mounting arm 1100 to locate vertical bottom mounting arms 1200 to avoid blocking any receptacles, ports (e.g., power, USB, HDMI, etc.), controls, etc. located on the back of display 1020. To position vertical bottom mounting arms 1200 horizontally (along longitudinal axis 1105) along horizontal mounting arm 1100 and vertically (along longitudinal axes 1205) relative to horizontal mounting arm 1100 such that horizontal mounting arm 100 can be generally positioned along vertical bottom mounting arms 1200 at other desired positions to avoid blocking any receptacles, ports (e.g., power, USB, HDMI, etc.), controls, etc. located on the back of display 1020, vertical bottom mounting arms 1200 have a plurality of protrusions 1245 that are configured to engage slots 1145 in horizontal mounting arm 1100. Protrusions 1245, which in the embodiment shown are formed as generally L-shaped hooks, extend from edges of vertical bottom mounting arms 1200 and are spaced apart along longitudinal axis 1205 by a predetermined distance. The spacing of slots 1145 along edge(s) 1140 of horizontal mounting arm 1100 and the engagement of protrusions 1245 in slots 1145 allows vertical bottom mounting arms 1200 to be positioned at multiple positions horizontally along longitudinal axis 1105 of horizontal mounting arm 1100. In addition, the spacing of protrusions 1245 along vertical bottom mounting arms 1200 allows horizontal mounting arm 1100 to be positioned at multiple positions vertically along longitudinal axes 1205 of vertical bottom mounting arms 1200. Once positioned, vertical bottom mounting arms 1200 can be attached and secured to horizontal mounting arm 1100 by threaded members 1250 that extend through apertures 1150 in horizontal mounting arm and are threaded into threaded apertures 1255 in vertical bottom mounting arms 1200, or in any other suitable manner.

One vertical top mounting arm 1500 is shown in the example of FIGS. 10-19, however, any number of vertical top mounting arms 1500 can be used depending on the size and weight of the display and the particular application. Vertical top mounting arm 1500 extends along a longitudinal axis 1505 between an upper end 1510 and an opposing lower end 1515 and, along with display brackets 1300, are used to support a top of display 1020.

Vertical top mounting arm 1500 is movable in relation to horizontal mounting arm 1100 such that horizontal mounting arm 1100 is positionable at multiple positions along longitudinal axis 1505 of vertical top mounting arm 1500. To position vertical top mounting arm 1500 vertically (along longitudinal axes 1505) relative to horizontal mounting arm 1100, vertical top mounting arm 1500 has an elongated slot 1570 that extends along longitudinal axis 1505. A plurality of threaded members 1575, which in the example shown are bolts that are secured by nuts 1580, extend through elongated slot 1570 and through holes in horizontal mounting arm 1100 and, when tightened, secure vertical top mounting arm 1500 against horizontal mounting arm 1100. Alternatively, threaded members 1575 can extend through elongated slot 1570 and be threaded into threaded apertures in horizontal mounting arm 1100. The positioning of threaded members 1575 in elongated slot 1570 allows horizontal mounting arm 1100 to be positioned at any position vertically along longitudinal axes 1505 of vertical top mounting arm 1500. Once positioned, vertical top mounting arm 1500 can be secured to horizontal mounting arm 1100 by tightening threaded members 1575.

The adjustability of horizontal mounting arm 1100 along longitudinal axis 1205 of vertical bottom mounting arms 1200 and along longitudinal axis 1505 of vertical top mounting arm 1500 allows placement of horizontal mounting arm 100 at various positions, preferably generally centered vertically between display brackets 1300 on lower ends 1215 on vertical bottom mounting arms 1200 and display bracket 1300 on upper end 1510 of vertical top mounting arm 1500, so that horizontal mounting arm 1100 does not block any receptacles, ports (e.g., power, USB, HDMI, etc.), controls, etc. located on the back of display 1020 when display 1020 is mounted in display mounting bracket 15.

In the embodiment shown, display brackets 1300 have a body portion 1305 and a flange 1310 that extends generally orthogonal to body portion 1305. Display brackets 1300 are attached to lower ends 1215 of vertical bottom mounting arms 1200 and upper ends 1510 of vertical top mounting arms 1500 via threaded members 1315 that extend through one of a plurality of apertures 1320 in body portion 1305 and are threaded into threaded apertures 1265 in lower end 1215 of vertical bottom mounting arms 1200 and threaded apertures 1565 in upper end 1510 of vertical top mounting arm 1500. The plurality of apertures 1320 spaced longitudinally along body portion 1305 of display brackets 1300 allow display brackets 1300 to be positioned in multiple positions to adjust the distance D1 between vertical bottom mounting arms 1200 and flanges 1310 of display brackets 1300 and the distance D2 between vertical top mounting arm 1500 and flanges 1310 of display brackets 1300 to accommodate displays having different depths. The distances D1, D2 can be adjusted such that distance D1 is different than distance D2 for displays that may have differing depths at the top and bottom of the display. Attaching display brackets 1300 via threaded members 1315 also allows display brackets 1300 to rotate relative to longitudinal axis 1205 of vertical bottom mounting arms 1200 and longitudinal axis 1505 of vertical top mounting arms 1500 so that flanges 1310 of display brackets 1300 can be positioned parallel (for flat front displays) or tangent (for curved front displays) to front surface 1025 of display 1020.

Figure 19:
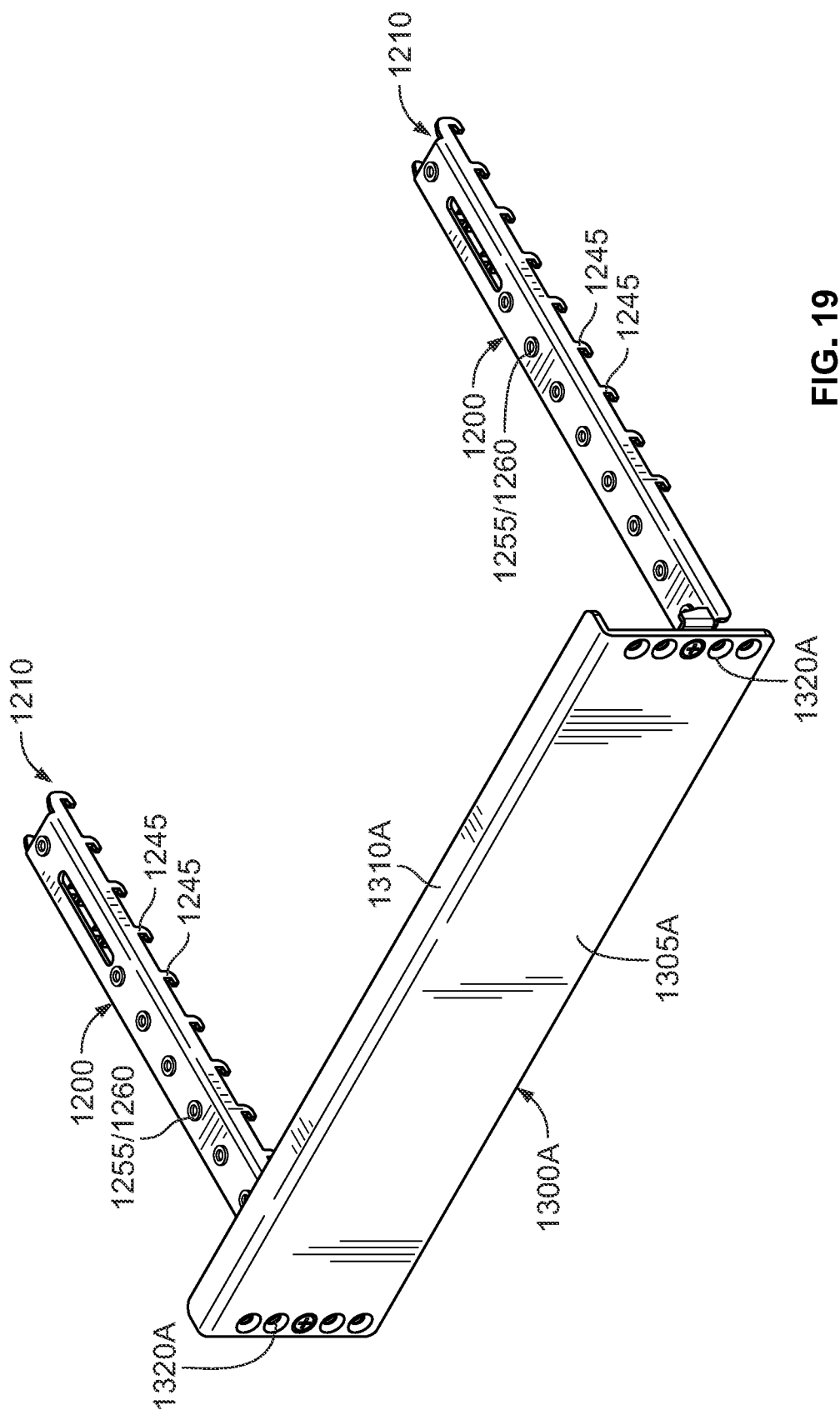
FIG. 19 is a perspective view of another example of a display bracket that can be used with the display mounting bracket of FIG. 10.

Alternatively, as shown in FIG. 19, rather than using individual display brackets 1300 at lower ends 1215 of vertical bottom mounting arms 1200 (or individual display brackets 300 at the first and/or second ends 210, 215 of vertical mounting arms 200 of display mounting bracket 10), one, elongated display bracket 1300A could be used that extends between and is attached to both vertical bottom mounting arms 1200 (or vertical mounting arms 200 of display mounting bracket 10). As with individual display brackets 1300, display bracket 1300A has a body portion 1305A that extends between vertical bottom mounting arms 1200 and a flange 1310A that extends generally orthogonal to body portion 1305A. Display bracket 1300A is attached to lower ends 1215 of vertical bottom mounting arms 1200 via threaded members 1315 that extend through one of a plurality of apertures 1320A that are aligned on opposing sides of body portion 1305 and are threaded into threaded apertures 1265 in lower end 1215 of vertical bottom mounting arms 1200. The plurality of apertures 1320A spaced along either end of body portion 1305A allows display bracket 1300A to be positioned in multiple positions to adjust the distance D1 between vertical bottom mounting arms 1200 and flange 1310A of display bracket 1300A to accommodate displays having different depths.

Compression pads 1400 engage back surface 1030 of display 1020 and are configured to bias or urge display 1020 forward and into contact with flanges 1310 of display brackets 1300 to secure display 1020. In the embodiment shown, there are three compression pads 1400 shown, one on each vertical bottom mounting arm 1200 and one on vertical top mounting arm 1500 and each corresponding to a respective display bracket 1300. However, any number of compression pads can be used (e.g., two or more per vertical bottom mounting arm 1200 and/or vertical top mounting arm 1500) so long as display 1020 is sufficiently urged against flanges 1310 of display brackets 1300 to secure display 1020. Compression pads 1400 are movably secured to vertical bottom mounting arms 1200 and vertical top mounting arms 1500 via threaded posts 1405 that are connected to the back of compression pads 1400 and are threaded into threaded apertures 1260 in vertical bottom mounting arms 1200 and threaded apertures 1560 in vertical top mounting arms 1500 such that the distance between vertical bottom mounting arms 1200/vertical top mounting arms 1500 and compression pads 1400 is adjustable. To adjust the distance between compression pads 1400 and vertical bottom mounting arms 1200/vertical top mounting arms 1500, threaded posts 1405 can be rotated in a first direction (e.g., clockwise) to move compression pads 1400 toward vertical bottom mounting arms 1200/vertical top mounting arms 1500 or rotated in a second direction (e.g., counter-clockwise) to move compression pads 1400 away from vertical bottom mounting arms 1200/vertical top mounting arms 1500 and toward engagement with back surface 1030 of display 1020. In the embodiment shown, compression pads 1400 are rubber feet that can conform to back surface 1030 of display 1020 to allow compression pads 1400 to be used with flat, angled, or curved back displays. Alternatively, compression pads 1400 could also be made of a more rigid material and be connected to threaded posts 1405 through ball joints, which would allow the more rigid compression pads to move to engage back surface 1030 of display 1020.

To mount a display 1020 using the example display mounting bracket 15, vertical bottom mounting arms 1200 (e.g., first and second vertical bottom mounting arms 1200) are positioned horizontally along horizontal mounting arm 1100, with the distance between vertical bottom mounting arms 1200 determined based on the width of display 1020. Preferably, vertical bottom mounting arms 1200 are positioned so that they do not block any receptacles, ports (e.g., power, USB, HDMI, etc.), controls, etc. located on the back of display 1020 when display 1020 is mounted in display mounting bracket 15 and such that display brackets 1300 at lower ends 1215 of vertical bottom mounting arms 1200 are proximate the outer ends of display 1020 to provide the greatest support. Vertical top mounting arm 1500 is also positioned horizontally along horizontal mounting arm 1100, preferably between vertical bottom mounting arms 1200.

Vertical bottom mounting arms 1200 and vertical top mounting arm 1500 are also adjusted vertically relative to horizontal mounting arm 1100 so that horizontal mounting arm 1100 does not block any receptacles, ports (e.g., power, USB, HDMI, etc.), controls, etc. located on the back of display 1020 when display 1020 is mounted in display mounting bracket 15. Preferably, horizontal mounting arm 1100 is generally centered vertically between display brackets 1300 on lower ends 1215 on vertical bottom mounting arms 1200 and display bracket 1300 on upper end 1510 of vertical top mounting arm 1500. The respective protrusions 1245 on vertical bottom mounting arms 1200 can then be inserted in a corresponding slot 1145 in horizontal mounting arm 1100 and vertical bottom mounting arms 1200 can be attached to horizontal mounting arm 1100 via threaded members 1250 inserted through apertures 1150 in horizontal mounting arm 1100 and threaded into threaded apertures 1255 in vertical bottom mounting arm 1200. In addition, vertical top mounting arm 1500 can be attached to horizontal mounting arm 1100 by inserting threaded members 1575 through elongated slot 1570 in vertical top mounting arm 1500 and into threaded apertures in horizontal mounting arm 1100, or through holes in horizontal mounting arm 1100 and secured by nuts 1580.

Display brackets 1300 are attached to lower ends 1215 of vertical bottom mounting arms 1200 and upper end 1510 of vertical top mounting arm 1500 so that flanges 1310 of display brackets 1300 are spaced apart from vertical bottom mounting arms 1200 by distance D1 and from vertical top mounting arm 1500 by distance D2, which should be greater than the depth of display 1020. The distances D1, D2 can be determined based on which aperture 1320 is used to receive threaded member 1315. Display brackets 1300 can also be rotated so that flanges 1310 of display brackets 1300 are parallel or tangent to front surface 1025 of display 1020 and secured to vertical bottom mounting arms 1200 and vertical top mounting arm 1500 via threaded members 1315 inserted through one of the apertures 1320 in display bracket 1300 and threading into threaded apertures 1265, 1565 in vertical bottom mounting arms 1200 and vertical top mounting arm 1500.

Display 1020 can then be positioned between display brackets 1300 and compression pads 1400 can be adjusted by rotating threaded posts 1405 until compression pads 1400 engage back surface 1030 of display 1020 and front surface 1025 of display 1020 engages flanges 1310 of display brackets 1300 to secure display 1020 between compression pads 1400 and flanges 1310.

Once display 1020 is secured, horizontal mounting arm 1100 can be attached to mounting plate 1120. For example, mounting plate 1120 can be inserted between protrusions 1110 in horizontal mounting arm 1100 and threaded member 1135 inserted through aperture 1125 and threaded into a threaded aperture in horizontal mounting arm 1100.

While various embodiments have been described above, this disclosure is not intended to be limited thereto. Variations can be made to the disclosed embodiments that are still within the scope of the appended claims.

The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A display mounting bracket, comprising:
   a horizontal mounting arm;
   a mounting plate attached to the horizontal mounting arm;
   a vertical bottom mounting arm attached to the horizontal mounting arm, wherein the vertical bottom mounting arm is movable and positionable at multiple positions along a longitudinal axis of the horizontal mounting arm;

a vertical top mounting arm attached to the horizontal mounting arm;

a first display bracket attached to a lower end of the vertical bottom mounting arm;

a second display bracket attached to an upper end of the vertical top mounting arm;

a first compression pad movably secured to the vertical bottom mounting arm; and a second compression pad movably secured to the vertical top mounting arm.

2. The display mounting bracket of claim 1, comprising:

a second vertical bottom mounting arm attached to the horizontal mounting arm, wherein the second vertical bottom mounting arm is movable and positionable at multiple positions along the longitudinal axis of the horizontal mounting arm;

a third display bracket attached to a lower end of the second vertical bottom mounting arm; and a third compression pad movably secured to the second vertical bottom mounting arm.

3. The display mounting bracket of claim 1, wherein the horizontal mounting arm comprises a pair of opposing protrusions configured to receive the mounting plate and an aperture configured to receive a threaded member to secure the mounting plate to the horizontal mounting arm.

4. The display mounting bracket of claim 3, wherein the mounting plate is configured to be attached to a VESA standard compliant mounting plate.

5. The display mounting bracket of claim 1, wherein:

the horizontal mounting arm comprises a plurality of slots formed in an edge of the horizontal mounting arm and spaced apart along the longitudinal axis of the horizontal mounting arm; and the vertical bottom mounting arm comprises a first plurality of protrusions spaced apart along a longitudinal axis of the vertical bottom mounting arm, the first plurality of protrusions configured to engage the plurality of slots in the horizontal mounting arm such that the vertical bottom mounting arm is positionable at multiple positions along the longitudinal axis of the horizontal mounting arm and at multiple positions along the longitudinal axis of the vertical bottom mounting arm.

6. The display mounting bracket of claim 1, wherein the vertical bottom mounting arm is secured to the horizontal mounting arm by a threaded member extending through an aperture in the horizontal mounting arm and threaded into a threaded aperture in the vertical bottom mounting arm.

7. The display mounting bracket of claim 1, wherein the vertical top mounting arm is secured to the horizontal mounting arm by one or more threaded members that extend through a slot in the vertical top mounting arm and are threaded into threaded apertures in the horizontal mounting arm.

8. The display mounting bracket of claim 1, wherein the first and second display brackets have a body portion and a flange that extends generally orthogonal to the body portion.

9. The display mounting bracket of claim 8, wherein:

the first display bracket is positionable in multiple positions to adjust a distance between the vertical bottom mounting arm and the flange of the first display bracket; and the second display bracket is positionable in multiple positions to adjust a distance between the vertical top mounting arm and the flange of the second display bracket.

10. The display mounting bracket of claim 9, wherein the first display bracket is rotatable relative to the longitudinal axis of the vertical bottom mounting arm and the second display bracket is rotatable relative to the longitudinal axis of the vertical top mounting arm.

11. The display mounting bracket of claim 1, wherein:

the first compression pad is movably secured to the vertical bottom mounting arm through a first threaded post that is threaded into a threaded aperture in the vertical bottom mounting arm such that a distance between the vertical bottom mounting arm and the first compression pad is adjustable; and the second compression pad is movably secured to the vertical top mounting arm through a second threaded post that is threaded into a threaded aperture in the vertical top mounting arm such that a distance between the vertical top mounting arm and the second compression pad is adjustable.

12. The display mounting bracket of claim 11, wherein the first and second compression pads are attached to the first and second threaded posts through ball joints.

13. A display mounting bracket, comprising:

a horizontal mounting arm;

a mounting plate attached to the horizontal mounting arm;

a vertical bottom mounting arm attached to the horizontal mounting arm and a vertical top mounting arm attached to the horizontal mounting arm;

a means for positioning the vertical bottom mounting arm horizontally along the horizontal mounting arm and vertically relative to the horizontal mounting arm and a means for positioning the vertical top mounting arm vertically relative to the horizontal mounting arm;

a first display bracket attached to a lower end of the vertical bottom mounting arm and a means for adjusting a distance between a flange of the first display bracket and the vertical bottom mounting arm;

a second display bracket attached to an upper end of the vertical top mounting arm and a means for adjusting a distance between a flange of the second display bracket and the vertical top mounting arm;

a first compression pad movably secured to the vertical bottom mounting arm and a means for adjusting a distance between the first compression pad and the vertical bottom mounting arm; and a second compression pad movably secured to the vertical top mounting arm and a means for adjusting a distance between the second compression pad and the vertical top mounting arm.

\* \* \* \* \*